United States Patent
Suominen

(10) Patent No.: US 10,567,173 B2
(45) Date of Patent: Feb. 18, 2020

(54) SECURE MESSAGING WITH DISPOSABLE KEYS

(71) Applicant: Callahan Cellular L.L.C., Wilmington, DE (US)

(72) Inventor: Edwin A. Suominen, Scottsdale, AZ (US)

(73) Assignee: Kioba Processing, LLC, Alpharetta, GA (US)

(*) Notice: Subject to any disclaimer, the term of this patent is extended or adjusted under 35 U.S.C. 154(b) by 0 days.

(21) Appl. No.: 16/029,982

(22) Filed: Jul. 9, 2018

(65) Prior Publication Data

US 2019/0140827 A1   May 9, 2019

Related U.S. Application Data

(60) Continuation of application No. 15/588,420, filed on May 5, 2017, now Pat. No. 10,020,938, which is a continuation of application No. 15/183,145, filed on Jun. 15, 2016, now Pat. No. 9,648,028, which is a continuation of application No. 14/537,629, filed on Nov. 10, 2014, now Pat. No. 9,374,227, which is a continuation of application No. 13/853,799, filed on Mar. 29, 2013, now Pat. No. 8,893,264, which is a continuation of application No. 13/214,928, filed on Aug. 22, 2011, now Pat. No. 8,417,956, which is a division of application No. 11/725,735, filed on Mar. 19, 2007, now Pat. No. 8,006,299, which is a continuation of application No. 10/092,943, filed on Mar. 5, 2002, now Pat. No. 7,194,618.

(60) Provisional application No. 60/273,862, filed on Mar. 5, 2001.

(51) Int. Cl.
| | |
|---|---|
| H04L 9/08 | (2006.01) |
| G06F 21/64 | (2013.01) |
| G06F 21/31 | (2013.01) |
| H04L 9/32 | (2006.01) |
| H04L 29/06 | (2006.01) |
| H04L 29/08 | (2006.01) |

(52) U.S. Cl.
CPC ............ *H04L 9/0891* (2013.01); *G06F 21/31* (2013.01); *G06F 21/64* (2013.01); *H04L 9/088* (2013.01); *H04L 9/0894* (2013.01); *H04L 9/3247* (2013.01); *H04L 63/0428* (2013.01); *H04L 63/083* (2013.01); *H04L 63/123* (2013.01); *H04L 67/06* (2013.01)

(58) Field of Classification Search
CPC ...... H04L 9/088; H04L 9/0891; H04L 63/068
See application file for complete search history.

(56) References Cited

U.S. PATENT DOCUMENTS

| | | | | |
|---|---|---|---|---|
| 5,970,149 A * | 10/1999 | Johnson | ............... | G06F 11/0709 380/2 |
| 6,363,480 B1 * | 3/2002 | Perlman | .................. | H04L 9/083 713/164 |
| 6,463,155 B1 * | 10/2002 | Akiyama | ............... | H04H 20/28 348/E7.063 |
| 2002/0112168 A1 * | 8/2002 | Filipi-Martin | ...... | H04L 63/0428 713/183 |

OTHER PUBLICATIONS

U.S. Appl. No. 60/248,060, filed Nov. 13, 2000.*

* cited by examiner

*Primary Examiner* — Minh Dinh
(74) *Attorney, Agent, or Firm* — Meunier Carlin & Curfman LLC

(57) ABSTRACT

Methods, apparatus, and systems are disclosed for, among other things, secure passphrase handling for computing devices. In one respect, a method is provided. The method includes receiving a plurality of passphrase elements from an input device. The method also includes performing a sequence of secure delay processing operations, each operation generating a delayed output value from an initial value. The passphrase is verified upon completion of the sequence of secure delay processing operations. Further, initial values of respective secure delay processing operations are based on respective passphrase elements and, for each secure delay processing operation after a first secure delay processing operation, a delayed output value from at least one other secure delay processing operations.

20 Claims, 18 Drawing Sheets

To verify a digital signature, the viewer searches the graphical rendering of the signed document for the distinctive graphical outline of the signature block. Distinctive features of the graphical outline can include (1) a distinctive color such as maroon, (2) a distinctive line shape such as double parallel lines, and (3) a distinctive line weight such as 3.2 points (not an integer or x.5 fractional properties are present in the simulated signature block for this d       514       the signature block can have a predetermined size to further id       516    SIGN HERE    cation of the signature block, Once the viewer software has id       512    ature block (up to and including the border) it removes all of the graphic data of the graphic data within the block to obtain the value of and sets it to the default blank value used during signature calculation. It performs an optical character recognition of the signature data within the block to obtain the value of the digital signature. According to advantageous aspects of the invention disclosed elsewhere, the digital signature can be applied to a secure delay to obtain another, larger digital signature value. The digital signature value (as shown or as expanded through a secure delay) is then validated against the modified TIFF representation of the document.

510

500

Very truly yours,

Edwin A. Suominen

FIG. 5

To verify a digital signature, the viewer searches the graphical rendering of the signed document for the distinctive graphical outline of the signature block. Distinctive features of the graphical outline can include (1) a distinctive color such as maroon, (2) a distinctive line shape such as double parallel lines, and (3) a distinctive line weight such as 3.2 points (not an integer or x.5 fraction). All of these distinctive properties are present in the simulated signature block for this document. In addition, the signature block can have a predetermined size to further identify it.

Once the viewer software has identified the exact location of the signature block, it removes all of the graphic data of the signature block (up to and including the border) and sets it to the default blank value used during signature calculation. It performs an optical character recognition of the signature data within the block to obtain the value of the digital signature. According to advantageous aspects of the invention disclosed elsewhere, the digital signature can be applied to a secure delay to obtain another, larger digital signature value. The digital signature value (as shown or as expanded through a secure delay) is then validated against the modified TIFF representation of the document.

500

Very truly yours,

600

-SelfCertify.com Digital Signature-
1410-2708-9007-5781-6673
7701-3376-8745-3789-9100
7440-2788-7101-4089-2409
5420-2178-9001-7680-1477
7731-3376-2645-3789-9105

Edwin A. Suominen

FIG. 6

FIG. 7 ed@eepatents.com, No Subject

To:
From: Ed Suominen <ed@eepatents.com>
Subject:
Cc:
Bcc: ed@eepatents.com
Attached:

LAW OFFICES OF LOUIS J. HOFFMAN, P.C.
14614 North Kierland Boulevard, Suite 300 * Scottsdale, Arizona 85354
Telephone: (480) 948-3295 * Facsimile (480) 948-3387

Edwin A. suominen * Admitted to practice in patent matters before the U.S. Patent Office only
Web Site: http://eepatents.com * PGP Public Key: http://eepatents.com/key

700

-----BEGIN PGP SIGNED MESSAGE-----
Hash: SHA1

This is an example of a message that has been signed with preserved formatting and an *unobtrusive* digital signature around clear-signed text, according to various aspects of the present inventions.

-----BEGIN PGP SIGNATURE-----
Version: PGP Personal Privacy 6.5.8 iQA/AwUBOqO3eqmKuMvNCWDGEQLwpwCePj1y0iuPEKIeRsSyqTCA7S++MpIAnRPv
qttmsePjh/WqGafymg/hVMs
=q4Oy
-----END PGP SIGNATURE-----

710

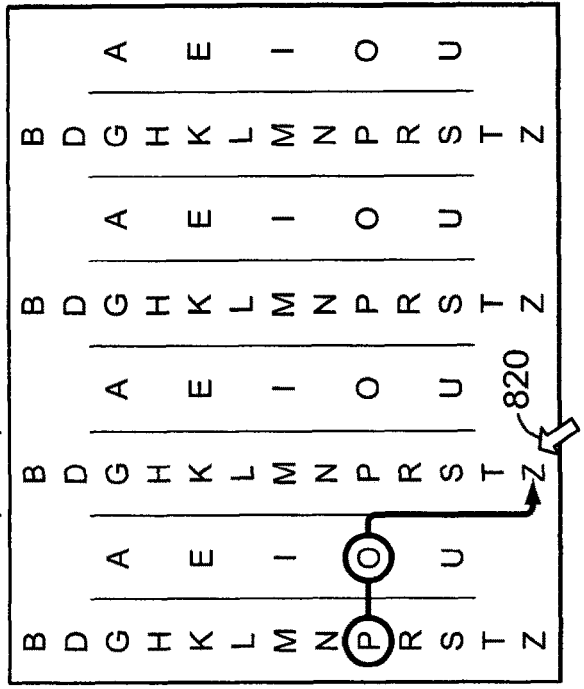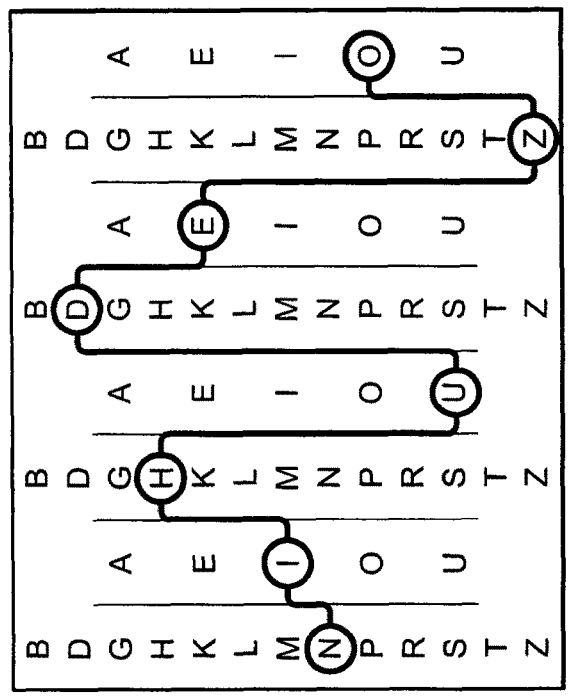
FIG. 10

| | | | | | | | | | |
|---|---|---|---|---|---|---|---|---|---|
| B | A | B | A | B | A | B | A | B | A |
| D | E | D | E | D | E | D | E | D | E |
| G | I | G | I | G | I | G | I | G | I |
| H | | H | | H | | H | | H | |
| K | O | K | O | K | O | K | O | K | O |
| L | U | L | U | L | U | L | U | L | U |
| M | | M | | M | | M | | M | |
| N | | N | | N | | N | | N | |
| P | | P | | P | | P | | P | |
| R | | R | | R | | R | | R | |
| S | | S | | S | | S | | S | |
| T | | T | | T | | T | | T | |
| Z | | Z | | Z | | Z | | Z | |

Passphrase confirmed. Your signature has been applied.

Click on the first letter of your passphrase and move your mouse pointer up and down over the next column of letters to move the arrow to the second letter of the passphrase. Then click and repeat until you've entered the entire passphrase. If you prefer, you can drag the arrow line through all letters of the passphrase without releasing your mouse button.

If you are certain your computer is secure and your keystrokes are not being logged somehow, you can also type your passphrase in the text box above.

Private Key Delayed Unlock

FIG. 12

SECURE MESSAGING WITH DISPOSABLE KEYS

CROSS-REFERENCE TO RELATED APPLICATIONS

This application is a continuation of and claims a priority benefit from U.S. patent application Ser. No. 15/588,420, filed May 5, 2017 which is a continuation of U.S. patent application Ser. No. 15/183,145, now U.S. Pat. No. 9,648,028, filed Jun. 15, 2016, which is a continuation of U.S. patent application Ser. No. 14/537,629, now U.S. Pat. No. 9,374,227, filed Nov. 10, 2014, which is a continuation of U.S. patent application Ser. No. 13/853,799, now U.S. Pat. No. 8,893,264, filed Mar. 29, 2013, which is a continuation of U.S. patent application Ser. No. 13/214,928, now U.S. Pat. No. 8,417,956, filed Aug. 22, 2011, which is a divisional of U.S. patent application Ser. No. 11/725,735, now U.S. Pat. No. 8,006,299, filed Mar. 19, 2007, which is a continuation of U.S. patent application Ser. No. 10/092,943, now U.S. Pat. No. 7,194,618, filed Mar. 5, 2002, which claims the benefit of U.S. Provisional Application No. 60/273,862, filed Mar. 5, 2001. All of these applications, including all materials incorporated by reference therein and any appendices thereof, are incorporated herein by reference in their entirety. Any and all priority claims identified in the Application Data Sheet, or any correction thereto, are hereby incorporated by reference under 37 C.F.R. § 1.57.

BACKGROUND OF THE INVENTION

Field of the Invention

With the "Electronic Signatures in Global and National Commerce Act" of 2000, the U.S. Congress gave digital signatures the same legal validity as an ink signature on a piece of paper. Now, the sender of an email message, word processing document, or any other type of electronic record that can be construed as a written contract can be legally bound to that record if the recipient can prove that the sender authenticated the record.

Electronic records that are signed with digital signatures can be proved, to a very high level of certainty, to be authenticated by the person who caused the digital signature to be applied to the record. The digital signature can only be applied with a private key, which is an incredibly large number that uniquely corresponds to another incredibly large number, called a public key. The private key, as its name implies, is kept a strict secret by the person who uses it to sign his or her digital signature. Strong cryptographic software ensures that it is "computationally infeasible" (i.e., very difficult, even with very fast computers) to derive the private key from the public key. When a person signs an electronic record with their private key, a digital signature code is produced that anyone can verify against the public key, which is publicly accessible. The slightest change in a document so signed will cause the digital signature to no longer match the document.

The cryptography used in digital signatures is very strong and nearly impossible to tamper with, at least with current technology. But a very old problem remains that technology alone cannot entirely solve. That problem is trust.

The trust problem in digital signatures can be summarized as follows: How do you know that the public key really belongs to the person who says it belongs to him or her? Anyone can create a public key and call it someone else's, then use the corresponding private key to create forged electronic records. The 1998 edition of The Global Trust Register, a printed directory of public keys published by a group of cryptography experts, states the problem as follows: "[T]here is no cheap and effective way for Internet users to check the validity of public keys on which they may wish to rely."

The experts who wrote The Global Trust Register made that statement in spite of the many efforts by Certification Authorities (CAs) to deploy a "hierarchical trust" model, where trusted third parties check out the identity of persons who own private/public key pairs. A CA such as VeriSign, Entrust, or Thawte will add its digital signature to a public key if the public key is tied to the name of a person who physically appears with proper documentation to prove their identity. Recipients of documents signed with the certified public key are then expected to trust that the CA has done its job and that the public key really came from the person whose name is tied to it.

But what happens when one of the many employees at the CA doesn't do his or her job properly? Who is liable for the recipient's reliance on a forged document promising delivery of 10,000 widgets for $1,000,000 when the sender has pocketed the money and run, completely anonymously due to the faceless nature of the Internet? The recipient cannot sue the sender if the recipient doesn't know the sender really was. The recipient's only course of action is to sue the CA for not doing its job. CAs try to avoid liability with disclaimer language in their Certification Practice Statements.

What about tort claims against the CA? Here's what the text Certification Authority Liability Analysis has to say about that: "A CA's liability for tort claims based on negligence may be limited by the so-called 'economic loss doctrine.' The economic loss doctrine provides that claims for purely economic losses based on product defects are not recoverable in tort. The rule holds simply that tort liability does not arise for pure economic loss, but only for personal injury or property damage. The principles behind this rule are that protecting personal injury and property damage claims are more important social policies than pure economic (business) losses, and that economic losses are better protected by negotiated contract allocations rather than through generalized tort law" (Certification Authority Liability Analysis Section 1.1, American Banker's Association, 1998).

In addition to the problems with "hierarchical trust" that should now be apparent, reliance on the Certification Authority as a trusted third party requires the CA to have an established reputation and to keep its digital house in order for a long time. It doesn't do much good to have a "trusted" third party certifying a digital signature if that third party disappears, loses data, or is found out to have some serious security breach in its infrastructure.

In view of these problems, a system is needed that will translate the direct trust from signer to recipient that self-authenticating ink signatures now provide into the realm of digital signatures. The solution, applicant has discovered, is combining technology with the trusted authentication that ink signatures and signature witnesses have established over hundreds of years of history.

Another need addressed by the inventions is for a system of destroying electronic communications or records when the sender and recipient of the communications agree to do so. In private confidential conversation, two people can have a conversation without leaving any record of their conversation. With written or electronic communications, however, there is some record of what was said. That record can be difficult to eliminate. While paper communications such as letters can be shredded if both sender and recipient agree that they will destroy their copies, electronic communications (e-mail) are more difficult to eliminate because backup copies can be made and automatically archived onto other locations. It is sometimes surprising that backup copies are available during discovery of communications that would be embarrassing.

Another need addressed by the inventions is dispensing with the need for the modulus in the multiplicative group xy modulo p to be fixed with respect to the order of the input and output set. The IDEA cipher uses a multiplicative group modulo $p=2^{16}+1$ (which is prime) along with two other group operations to encrypt binary data in the set of 16-bit integers, but very few known moduli have the desirable property of being exactly one greater than a power of two. The result is an undesirable lack of scalability.

Other needs addressed by the inventions of this application include providing a simple, intuitive way of authenticating an electronic record, making digital signatures unobtrusive, and increasing intractability to an attacker without creating any noticeable inconvenience for a legitimate user.

SUMMARY OF THE INVENTION

A "covenant trust" authentication system of the inventions employs a printed authorization and certification instrument (ACI) that, with an ink signature, legally binds the signer to digital signatures uniquely corresponding to (and thus created with) a positively identified public key. The key code in the ACI can be printed throughout the background of the entire paper as vertically oriented digits in various outline fonts.

A method of the invention for "self-certification of digital signature keys by contract" uses a covenant trust model of key certification. The method certifies a subscriber's public key by (a) having the subscriber execute an ACI; (b) confirming that the ACI has been signed and notarized in ink; and (c) publishing the confirmation for persons relying on the public key.

According to various aspects of the present inventions, an electronic record (e.g., MICROSOFT WORD document, AUTOCAD drawing, etc.) can be signed by "printing" that record to a special "virtual signature printer," which provides the user with an intuitive, simple way of authenticating an electronic record. The "virtual signature printer" system produces an output file (or multiple files) that can be sent to a recipient for viewing, printing, and validation. The recipient can view or print the file and, with special software, can validate the signature on the file.

A particularly advantageous way of signing an electronic record that has been "printed" this way is with embedded signatures. Per one embedded signature aspect, graphical indicia of a signature are placed within a graphical (image-based) representation of an electronic record. Per another embedded signature aspect, signature data is placed within an unused or backward-compatible field of an electronic record.

An element of the inventions is a processing-induced secure delay interposed between an input and output that transforms a given input value into an unpredictable but deterministic output value. A delay system according to another aspect of the invention makes a secure delay according to various aspects of the invention less obtrusive to the user by beginning the delay process when the user's passphrase has been partially entered. Advantageously, such a system performs the delay computations substantially in parallel with the unavoidable delay of the user's input of the passphrase.

A secure delay according to various aspects of the present inventions can be applied in other areas than just passphrase security. For example, a hash value can be run through a secure delay to produce a smaller hash value that would be computationally infeasible to derive based on a birthday attack.

The implementation of a secure delay with a pseudogroup operation is a particularly advantageous combination according to one aspect of the inventions. A pseudogroup operation according to various aspects of the present inventions dispenses with the need for the modulus p to be fixed with respect to the order of the input and output set in an operation of the type xy modulo p. Advantageously, the modulus can be chosen as whatever prime number is closest to the set order—above it or below it.

A cryptographic document destruction system according to various aspects of the invention includes an encryption subsystem and a decryption subsystem. The decryption subsystem using uses a temporary key that can be disposed of to make encrypted communications unreadable. Per one aspect, periodic purging of documents or e-mail messages, or both, is done by mutually agreed or scheduled destruction of shared keys, or both. Per another aspect, a hardware electronic record "lock" with a disposable key token is employed, such as a simple paper card with a bar code printed on it. The key token can be thrown away when the "locked" (i.e., encrypted) electronic record is to be purged, making decryption of it practically impossible.

The applicant contemplates that his inventions include all systems and methods that can be practiced from all suitable combinations of the various aspects disclosed and exemplary elements listed. Such combinations have particular advantages, including advantages not specifically recited herein.

BRIEF DESCRIPTION OF THE DRAWINGS

FIG. 5 illustrates part of an example document to be signed with a dashed box appearing over text of the document for application of a signer's digital signature "stamp," at a user-specified region.

FIG. 6 illustrates the document of FIG. 5 with a simulated digital signature that resides in a graphic within a signature block that is excluded from the signature calculation of the document.

FIG. 7 illustrates an example of a message that has been signed with preserved formatting and an unobtrusive digital signature around clear-signed text.

FIGS. 8-12 illustrate screen shots of an exemplary user interface at different points during the input of a passphrase without the use of keystrokes.

DETAILED DESCRIPTION OF THE PREFERRED EMBODIMENT

Figure 1:
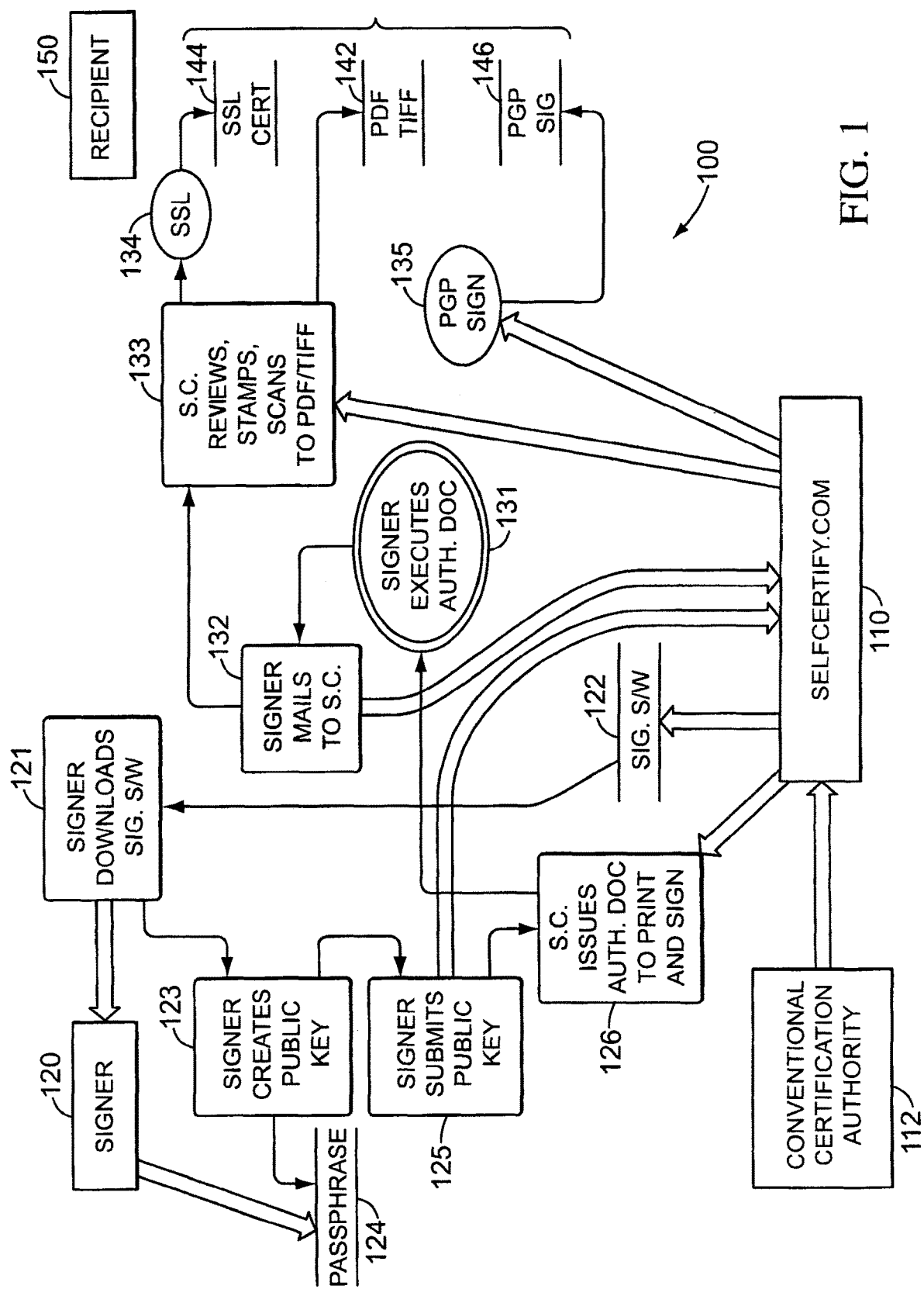
FIG. 1 is a flow diagram of a signer enrollment procedure of an exemplary self-certification process.

The "Covenant Trust" authentication system employs an authorization and certification instrument ("ACI") that, with a holographic (ink) signature, legally binds the signer to digital signatures uniquely corresponding to (and thus created with) a positively identified public key.

An example is shown in Appendix A of the application as originally filed. It includes the following text superimposed on vertically-oriented background digits "FC1D 9CBF B80D E940 6250 7CAD 070F 90BA CDA2 44DO" in various fonts and sizes.

"Using a PGP-compatible cryptosystem, I have created a 'DH/DSS' private key ('the Private Key') and public key ('the Public Key'). The Public Key uniquely corresponds to a 160-bit 'fingerprint' (SHA-1 hash). The fingerprint is printed below as ten groups of four hexadecimal digits, and in various outline fonts throughout the background of this entire paper and in all its signature fields: FC1D 9CBF B80D E940 6250 7CAD 070F 90BA CDA2 44DO.

"The Private Key uniquely corresponds to the Public Key but is computationally infeasible to derive from the Public Key. (Two data sets are said to 'uniquely correspond' when it is computationally infeasible that data sets other than those uniquely corresponding could be found to match, using the cryptographic process that is intended to match the data sets.) From time to time, I expect to apply my digital signature to electronic records, with the same legal effect as my ink signature would have on a printed copy thereof. When I do so, a set of signature data is produced that uniquely corresponds to both the document being signed and the Public Key. The slightest change in a document so signed will cause the digital signature to no longer match it.

"By executing this authentication and certification instrument ('ACI'), I acknowledge, stipulate, and covenant that any electronic record accompanied by a digital signature that uniquely corresponds to both the document and the Public Key (in accordance with the Digital Signature Standard) was signed by me, beyond any reasonable level of doubt. I COVENANT WITH ANY BEARER OF THIS AUTHORIZATION OR FACSIMILE COPY THEREOF NOT TO REPUDIATE SUCH DIGITAL SIGNATURE UNLESS I COMMUNICATE A REVOCATION OF THE PUBLIC KEY TO THE BEARER IN WRITING BEFORE THE SIGNATURE DATE. (A 'writing' is an electronic record signed with the digital signature or a paper signed with my ink signature.) A revocation will be deemed constructively communicated upon publication at SelfCertify.com.

"I agree to always keep the Private Key encrypted (except during brief intervals of use) with a secure passphrase that only I know, to never reveal the passphrase to anyone (except as compelled to do so by law), and to use the Private Key only on trustworthy computer systems. I understand that the consequence of failing to do so is the possible forging of my digital signature, which is subject to the non-repudiation covenant above. I understand that to be trustworthy, a computer system must employ computer hardware, software, and procedures that: (1) are reasonably secure from intrusion and misuse; (2) provide a reasonably reliable level of availability, reliability, and correct operation; (3) are reasonably suited to performing their intended functions; and (4) adhere to generally accepted security principles. (Digital Signature Guidelines, American Bar Association, 1996.) I have read, understand, and agree to follow guidelines provided to me by SelfCertify.com for selecting a secure passphrase and for ensuring that all computer systems on which I use the passphrase remain trustworthy.

"Any ACI (or facsimile copy thereof) including (1) language substantially identical to that above, (2) the fingerprint (or key value) of any other public key, and (3) what is purported to be my notarized handwritten signature is presumed to be a forgery unless it is accompanied by a written revocation of the Public Key of this ACI or a digitally signed ACI of the other key, signed with the Public Key of this ACI. The written revocation can be signed with my original, notarized ink signature or digitally with the Public Key of this ACI."

The background digits are of a fingerprint, a number typically fairly long (e.g., 160 bits), uniquely corresponding to an electronic record (e.g., a signing key, encryption key, dual function key, computer file, etc.) Often, a fingerprint is simply a hash (e.g., SHA-1) of the electronic record. According to aspects of the present inventions, a fingerprint can be encoded into a user-memorable form, such as that used in the pronounceable passphrase aspects of the inventions, or a familiar-type number resembling a telephone number, ZIP code, etc.

The example ACI further includes signature, notarization, and certified copy portions, also superimposed on the background digits. The notarization portion includes the following statement: "This (blank) day of (blank), (blank), the above-named person personally came before me, produced a mailing label of an overnight delivery package listing him or her as the addressee and two forms of identification (including one with a matching photograph). The person then executed the foregoing ACI in my presence. On the line below, I have written the mailing or tracking number of the mailing label. I will mail this signed document directly to SelfCertify.com at the return address shown on the mailing label."

The ACI is a legal instrument executed by a conventionally accepted technique (e.g., handwritten ink, a witnessed audio or video recording, etc.) that does not rely on digital signature technology. The instrument includes a covenant not to repudiate a particularly identified digital signature key of the signer, making electronic records authenticated with that digital signature key as valid (assuming the court accepts the certification) as the conventional signature on the ACI.

The background digits of the example ACI can be read in the background of a document "behind" other alphanumeric indicia. In a particularly advantageous arrangement of the example ACI, some of the background digits are oriented perpendicular to the main orientation of the document. In another particularly advantageous arrangement of the example ACI, small background digits fill a substantial portion of one or more document signature, stamp, and/or annotation fields. In the example, the small background digits are in the signature fields where "void" is handwritten in place of actual signatures.

Background digits according to various aspects of the inventions advantageously maintain a contextual thread between (1) inked indicia (e.g., one or more holographic signatures, a notary stamp, etc.) in a document and (2) printed indicia elsewhere in the document, making it difficult to "lift" the image of such inked indicia and transfer it to a forged document. The background digits are preferably in an outline font to maintain readability of the main document indicia. The spacing, font size, and font type of the digits is preferably varied in a way unpredictable to a forger (e.g., pseudorandomly) to make duplication of an "erasing negative" of the background digits difficult. (An erasing negative could conceivably be used to eliminate background digits and permit "lifting" of inked indicia that would otherwise have digits in its background field.)

As discussed above, an ACI binds a signer to a digital signature uniquely corresponding to a positively identified public key. Most fingerprints and digital signatures could conceivably correspond to multiple records. However, the likelihood of finding a corresponding electronic record other than the one of interest, given a uniform probability of obtaining all possible fingerprints of digital signatures from a given record, is usually vanishingly small. The likelihood of finding a second match that could be mistaken for the electronic record of interest is so small, in most cryptographic applications, as to be considered impossible. Embodiments are certainly possible, however, in which an electronic record is considered to uniquely correspond to a fingerprint or digital signature with a higher probability of a false match.

The ACI is a specific example of a positive identification of an electronic record in which the electronic record is a public signing key. (Another example in which an electronic copy of a publicly accessible paper file is positively identified by a third party who has inspected the file is shown in Appendix F.) The identification employs an "integrated" combination of: (a) a code "uniquely corresponding" to that electronic record (e.g., a SHA-1 cryptographic hash code); and (b) a holographic signature (or facsimile thereof). The combination is said to be integrated when it would be difficult for a forger to separate the elements of the combination. Another way of describing an integrated combination of (a) and (b) is having a contextual thread between (a) and (b). (See the discussion of "background digits" above.)

A paper document or facsimile copy thereof containing the combination can include the following advantageous aspects: (1) the digits of the code can be printed in background digits of the document, including behind fields for handwriting, as in the above example ACI with background digits of a PGP "fingerprint"; (2) the document can include a facsimile copy of a photographic identification of the signer, which can be referenced in language of the document (e.g., a Notary's statement). For example, an ACI can include a photocopy of a driver's license.

A method for self-certification of digital signature keys by contract uses a covenant trust model of key certification. The method certifies a subscriber's public key by (a) having the subscriber execute an ACI; (b) confirming that the ACI has been signed and notarized in ink; and (c) publishing the confirmation for persons relying on the public key. A description of the method, describing benefits of the inventive method (as a technology rather than as a product or service) generally and in conjecture only, and regarding a specific example of the method, follows. The specificity of the example is not intended to any way limit the scope of the invention or imply that any product or service described has been offered for sale as of the application's filling date.

In the method, the covenant, an ancient concept, is applied to technology. The covenant trust model relies on a person's self-certification of his or her public key and a covenant by that person not to repudiate the public key. The "Covenant of Non-repudiation" legally binds the owner of the public key to any digital signatures created with the corresponding private key. Thus, the liability for proper usage of the private key is placed on the shoulders of the person owning the public key, where it belongs, and legal reliance can be placed upon the public key and any electronic record signed with the corresponding private key.

The covenant is made in an Authentication and Certification Instrument (ACI), a legally signed paper document that contains an identification code positively identifying the public key in question. The document is signed in ink and witnessed by a notary public, thus invoking an authentication system whose trust has been established and is universally recognized by our legal system.

The example ACI discussed above contains the following text: "I acknowledge and understand that the consequence of executing this authorization and certification instrument ("Authorization") is that any electronic record accompanied by a digital signature that uniquely corresponds to both the document and the Public Key was signed by me, with a negligible level of doubt. I covenant with any bearer of this Authorization or facsimile copy thereof not to repudiate such digital signature unless I communicate (directly or indirectly) a revocation of the Public Key to the bearer in writing before the signature date."

The ACI includes security features that make it extremely difficult to forge with identification of a different public key, even in a facsimile copy. A person receiving a copy of the ACI (from the signer, from the Internet, wherever) is in possession of a legal instrument that authenticates a public key without the need for trusted third parties. The role of a third party, if one is used at all, is simply to distribute facsimile copies of the ACI. For additional security, the third party can apply its digital signature to the copies of the ACI it distributes to certify them as true copies of the original signed in ink. For example, the third party can authenticate PDF or TIFF files containing facsimile copies of ACIs with a standard SSL (Secure Sockets Layer) certificate issued by a conventional CA.

The conventional "hierarchical trust" model attempts to establish a chain of authenticity to supposedly trusted third parties who are presumed to be doing their jobs properly. In contrast, the covenant trust model establishes a chain of authenticity to a legal covenant, signed with a notarized ink signature on an ACI, in which a public key owner promises not to repudiate digital signatures corresponding to that public key. The chain of authenticity can begin with initial reliance on the security features of a facsimile copy of the ACI and distribution of the ACI via a trusted web site, email sender, or remote-access viewing software. Higher up on the chain of authenticity, and still convenient to obtain, is digitally-signed certification of the copy by a trusted certifier. Still higher on the authenticity chain is the availability of ink-signed certified copies of the ACI by the original signer or, for a fee, by a trusted certifier. The ultimate link in the chain of authenticity can be provided by making the original notarized, ink-signed ACI paper available for inspection by experts, judges, juries, or attorneys during dispute resolution.

The following describes implementation of covenant trust via the Internet.

Overview

A new type of "Certification Authority" is discussed herein as being deployed at SelfCertify.com based on the covenant trust model. (This portion of the application describes benefits of the inventive method generally and, in conjecture only, a specific example of the method. The specificity of the example is not intended to in any way limit the scope of the invention.) SelfCertify.com (discussed here in the present tense for convenience) is a certification authority only in the sense that it registers public keys and the identity of persons who claim to own those keys, and certifies that copies of ACIs it distributes are true copies of originals in its possession. It does not certify the identities of the person claiming to own the public keys—those persons make that certification themselves in the ACI.

In addition to registering public keys and distributing ACIs for authentication of those keys, SelfCertify.com can provide standardized digital certificates (e.g., using the X.509 standard) to ensure that its subscriber's public keys can be validated in a manner compatible with conventional public key infrastructure. Again, SelfCertify.com does not pretend that the trust imparted by its digital certificates is based on its confirmation of the identity of its subscribers. Instead, SelfCertify.com makes a policy of only issuing certificates for public keys that subscribers have self-certified with their notarized ink signatures in ACI documents. By signing a public key with its X.509 certificate, SelfCertify.com simply indicates that it has reviewed the original ink ACI and that a copy of the document can be freely downloaded from its Web server.

The use of X.509 or other standard certificates permits SelfCertify.com to live in the world of conventional CAs even though it is based on an entirely different trust model. Users who accept the covenant trust model can install SelfCertify.com's root CA certificate (the "grandfather" certificate that validates all of its individual certificates) into their Web browsers and e-mail applications. As the covenant trust model gains acceptance in E-commerce, the manufacturers of Netscape Navigator and Internet Explorer can be expected to incorporate SelfCertify.com's root CA certificate into their browsers, alongside the certificates of VeriSign, entrust, and dozens of other CAs. Subscribers who use PGP (Pretty Good Privacy) and are looking for a way to validate their public keys outside PGP's "web of trust" model can submit their public keys to SelfCertify.com for it to be signed by SelfCertify.com's own PGP signature.

Because covenant trust does not require a trusted third party, subscribers' public keys can be validated directly from the subscriber's ACI. The public key of a SelfCertify.com subscriber can be validated by freely downloading a copy of the subscriber's ACI and checking its positive identification of the public key. Thus, no CA certificate is required at all. In fact, subscribers can directly distribute copies of their ACI to anyone who will be relying on signatures corresponding to their public keys.

Example Transaction Using Self Certify.com

Below is a brief description of an example transaction based on covenant trust. In this example transaction, SelfCertify.com serves as a third party for the following: (1) freely distributing a compact cryptographic software module to signer and recipient with instructions for secure use—the parties use the software for generation of the signer's private/public key pair, generation of the signer's digital signature on an electronic record, and validation of the digital signature against the signer's public key; (2) accepting credit card payment (with SSL encryption), public key codes, and full legal names of new subscribers to SelfCertify.com; (3) issuing blank ACIs to new subscribers, upon payment, with instructions for use; (4) scanning original signed ACIs received from new subscribers and posting digitally certified copies on the web for free downloading; and (5) retaining original ACIs in a vault for inspection by experts, judges, juries, or attorneys during dispute resolution.

For convenience, this example refers to a widget vendor named Alice and a purchaser named Bob. (These names seem to be used in just about every published example of cryptographic transactions.) Alice wishes to sign a purchase agreement acknowledging Bob's payment of $1,000,000 for 10,000 widgets and promises to deliver the widgets immediately. Bob wants to make sure that Alice, the president of Widgets Inc., is the person signing the agreement and not some "man-in-the-middle" impostor.

Signer Enrollment

Alice visits SelfCertify.com and quickly downloads a copy of "SelfCertify," a simple, compact, secure, and free cryptographic software application for the Microsoft Windows 98/NT/2000, operating system with versions available for various other operating systems. The SelfCertify software installs to the Windows tray as an icon, with various functions selectable by right-clicking on the icon. If she wishes to avoid the need for installation, Alice has the option of simply downloading a single executable file to her desktop and running it from there. For maximum convenience (but possibly less security), a JAVA version of the software can be offered for execution in a web browser.

Because SelfCertify.com serves its pages under SSL with a certificate issued by a conventional CA, Alice is assured that the software is authentic and trustworthy. For additional assurance, Alice reviews statements on the security of the software, written and digitally signed by various cryptographic experts, and validates the signatures of the statements before relying on the software.

Alice then follows the procedures outlined on SelfCertify.com for generating a public key from a secure passphrase. (See Appendix X of the application as originally filed and the discussion below of a "pronounceable passphrase worksheet".) She then gets out her credit card and subscribes to Self Certify.com with her credit card number, public key code, and full legal name.

Self Certify.com then issues Alice a custom-generated PDF file, from which Alice obtains two printed pages. The first page is a blank ACI with a space for her driver's license or other photographic ID and the second page is customized security paper with Alice's key code printed repeatedly in the background in an outline font.

Alice tapes her driver's license to the blank ACI in the space provided and places it on the glass of her photocopier, with the security paper at the top of her photocopier's paper supply. She then photocopies the blank ACI to produce an ACI, ready for her signature, with outline digits of her key code throughout its background.

Alice then checks the key code against her public key to make sure it is accurate, goes to the Notary Public down the hall, and executes the ACI in the presence of the notary. The notary examines Alice's driver's license, notes (in the ACI) any security features of it such as a hologram or colored background lines, and signs and stamps the ACI. Alice has now entered into a legally binding covenant with any person bearing the ACI or a facsimile copy of it. (So that she can keep a copy for her files and make certified copies herself, Alice elects to prepare and execute two original copies of the same ACI before the notary.)

Alice mails the executed ACI to Self Certify.com. Within a few days, SelfCertify.com scans the ACI and posts a copy of it on its web site in PDF or TIFF format. Self Certify.com stores the original ACI in a vault for possible inspection in the future by experts, judges, juries, or attorneys during dispute resolution. SelfCertify.com then emails Alice the following message: "Your Authorization and Certification Instrument (ACI) has been recorded and you are now listed as a fully enrolled subscriber of SelfCertify.com with key ABC01. Once you enter the enrollment password '3f8u2b' in your SelfCertify software, your software will automatically download the latest copy of our public key registry (now including your key) and will automatically validate your digital signatures with the following text in any messages you sign: 'The following text has been signed with a public key registered as key ABC0I at Self Certify.com. Alice B. Costas has signed a written covenant not to repudiate digital signatures created with this public key. To view a copy of this document, click here. The code of this public key is BD7D F2FD ECIC DF14 4811 574F F7CE 7DIE 6EB6 F7E9 CCF7 208B.' Persons relying on your digital signature will be able to easily download and inspect a copy of your ACI to legally bind you to that signature."

Signer's Digital Signature of Electronic Record

In her email software, Alice selects the text of her purchase agreement with Bob and right-clicks on the SelfCertify icon in the Windows tray. She then selects the menu item "sign" and, when prompted, enters her private key passphrase. She will probably have to look the passphrase up from a piece of paper in her purse the first few times she uses it. Later, she will put the piece of paper in her safe or destroy it if she trusts her memory enough. If she forgets or loses the passphrase, it's not a big deal. She only needs to create another public key from a new passphrase, cancel her original ACI, and request another one to continue signing records.

As soon as Alice has entered her passphrase, the text she selected in her HTML-formatted email is replaced by text that is identical (including any formatting) except for a block of hexadecimal codes and the following statement in a reduced-size font: "I, Alice B. Costas, have signed this document with my public key, which is registered as key ABC0I at SelfCertify.com. To verify this signature, click on http (colon, double forward slash) SelfCertify.com/validate to download a compact, virus-free signature verification program that confirms the signature and public key. The software will allow you to obtain a copy of a paper document that you can use to legally bind me to this digital signature. You can also independently validate the public key by clicking on http (colon, double forward slash) SelfCertify.com/?ABC001 to view a digitally certified copy of the document."

The formatting of the original text is preserved in the signed version. There is no header to the block of signed text because the SelfCertify software automatically calculates the beginning of the signed text block based on the number of signed characters, which is recorded in the signature block. Alice is free to select only a portion of the text for signature. For example, she may choose not to include letterhead at the top of her letters in the block of text she signs.

Alice can also use S/MIME email software such as Netscape Messenger or Outlook Express to sign email messages using conventional, standardized digital signature technology and the Covenant Trust model, without the need for the SelfCertify.com software. However, she needs to sign an ACI with the SHAI fingerprint of her S/MIME public key (called a "Digital ID") to authenticate it under the Covenant Trust model. SelfCertify.com then can issue a certificate for her S/MIME public key to authenticate it, based on her ACI.

Recipient's Validation of Digital Signature

Bob receives Alice's digitally signed purchase agreement and downloads the SelfCertify software from the link provided in Alice's signature block. He also downloads a copy of her ACI. Once the software has been installed as an icon, Bob selects Alice's entire e-mail and right-clicks on the icon, then selects "Verify." A window pops up that says: "The following text has been signed with a public key registered as key ABC0I at SelfCertify.com. Alice B. Costas has signed a written covenant not to repudiate digital signatures created with this public key. To view this paper, click here. The code of this public key is BD7D F2FD EC1C DF14 4811 574F F7CE 7DIE 6EB6 F7E9 CCF7 208B."

Since this is a $1,000,000 deal and he has never used the software before, Bob is not content with the software's assertion that Alice has entered into a legally binding covenant not to repudiate her digital signature with this key. Plus, Bob wants to have his lawyer look over the language of the covenant. So he clicks on the "here" link and a viewer window pops up with a TIFF copy of Alice's ACI. He prints out the ACI, notes that Alice's signature (which he recognizes from previous paper-based contracts) has been notarized and that the key code in the ACI is reproduced throughout the background of the document as vertically oriented digits in various outline fonts. The digits intermingle with the signatures, notary stamp, handwritten annotations, and images from Alice's driver's license. The key code digits even show up in the background of Alice's photograph in her driver's license.

Bob needs no further convincing that Alice was the one who signed the purchase agreement. His lawyer, however, wants him to check out SelfCertify.com's SSL certificate for the copied ACI. Bob downloads the ACI copy from SelfCertify.com and, with the image of the ACI in his Web browser, clicks on the "security" button of the browser. The browser provides a certificate issued to SelfCertify.com from a major CA, and Bob's lawyer is satisfied.

If Alice uses S/MIME to digitally signed her message, Bob can simply trust her S/MIME "Digital ID" based on the certificate SelfCertify has issued for it. Thus Alice and Bob can use the Direct Trust model with S/MIME signatures and conventional digital certificates, trusting Self Certify.com as a CA only for inspecting and verifying Alice's CA against the standard covenant language of the ACI, which is published at SelfCertify.com.

Alternatively, Bob can download and review Alice's ACI for her "Digital ID" from the web site of SelfCertify.com. If Bob chooses to download Alice's ACI, he will need to open Alice's "Digital ID," look for her SHA1 fingerprint, and compare it to the fingerprint printed on her ACI. This alternative procedure, while requiring an extra step, provides S/MIME signatures based more directly on the Covenant Trust model, moving closer to the ultimate link in the chain of authenticity, which is the original notarized, ink-signed ACI paper.

The key code in the ACI can be printed throughout the background of the entire paper as vertically oriented digits in various outline fonts, as in the example ACI discussed above. The font types, sizes, spacings, and line spacings are varied pseudorandomly in each ACI to make it difficult for an attacker to create an identical field of digits, which the attacker could use to remove the digits (by an XOR operation) from the ACI and substitute his or her own digits. Every bit of text and authenticating indicia in the ACI has background digits running through it. This feature (and possibly other features such as varying the spacing between digits of the text in a coded manner) protects both the signer of the ACI and the person relying on the ACI.

The ACI can be created with a two-step procedure using a first page that is a blank ACI with a space for her driver's license or other photographic ID and a second page that is customized security paper with the subscriber's public key code printed repeatedly in the background in an outline font. The subscriber tapes his or her photo ID to the blank ACI in the space provided in places it on the glass of her photocopier, with the security paper at the top of the photocopier's paper supply. The blank ACI is then photocopied to produce an ACI, ready for the subscriber's signature, with outline digits of her key codes throughout its background.

The ACI can include language that makes it the only printed document of its type that can be accepted as valid. Additional ACIs can be signed electronically for additional keys, but they must be signed with the key that is certified in the original paper ACI. SelfCertify.com attaches digitally signed ACIs (for a fee) to the PDF or TIFF file in which it distributes the original paper ACI. By ensuring that the original printed document disclaims all other documents purporting to bear the singer's handwritten signature, a "strength in numbers" validity system is established that gives the authenticity of a widely distributed ACI, publicly available from a trusted server, far more weight than a single forged copy having a different key code. This feature helps to protect the signer of the ACI.

The SelfCertify software can employ an ECDSA public key signature system with NIST Elliptic Curve P-192 (equivalent to 80-bit key length of symmetric cipher). The elliptic curve is described by a GF(p) field, where p is prime, to avoid recent attacks on elliptic curves from $GF(2^m)$, where m is a composite of smaller primes. See Smart, N. et al., "Constructive and Destructive Facets of Weil Descent on Elliptic Curves," HP Technical Report HPL-2000-10, 17 Jan. 2000.) A 192-bit public key can be represented by 12 groups of 4 hexadecimal digits. The short key length made possible by elliptic curve cryptography makes it easy for a recipient to visually verify the entire key code against the printed text of an ACI and the background security digits.

The subscriber can be instructed to use a standardized, pronounceable passphrase made of "pseudowords" with alternating consonants and vowels. The passphrase is designed to be relatively easy to memorize, pronounce, and type and is very secure, with an entropy of about $2^{64}$. The passphrase is created with simple, secure system using a piece of paper and a paper clip for random selection of digits.

An SHA-1 hash of the passphrase can be used as the private key, with the subscriber's full legal name (from the SelfCertify.com directory) incorporated (transparently to the signer) into the passphrase as "salt." The use of salt prevents passphrase attacks using precomputed hashes of passphrases within the standardized approximately $2^{64}$ passphrase space.

Formatting of signed text can be preserved after signing. The added text of the signature block is formatted in an unobtrusive font that does not detract from the appearance of the signed text. The text in the signature block includes a data field with the number of characters being signed, which avoids the need for a distracting header block (e.g., "-----BEGIN PGP SIGNED MESSAGE-----" in PGP). Documents can also be signed as files, in which case the signature resides in a separate".SIG" file, as is conventional.

ACIs can be automatically opened from the software's signature validation window, based on the identification information in the signature block, and displayed or printed from a compact viewing window.

FIG. 1 is a flow diagram of a one-time procedure for signer enrollment in an exemplary self-certification process, involving a signer 120 and a recipient 150. The process includes several transmissions to and from the SelfCertify.com site, block 110, discussed in the conjectural example above. The site serves its pages under SSL (a conventional certificate authority 112, e.g., Thawte, connects to site 110).

Signer 120 downloads signature software 122 from SelfCertify.com at 121 and then employs a passphrase 124 to create a public key at 123. Signer 120 submits the public key at 125. The site, at 126, issues an authentication document for signer 120 to print and sign.

At 131, signer 120 executes the authentication document. At 132, signer 120 mails the document to SelfCertify.com.

At 133, SelfCertify.com reviews, stamps, and scans the document to a PDF or TIFF file 142. File 142 is then available along with the site's SSL certificate 144 and a PGP signature 146, which results from PGP signing at 135.

Figure 2:
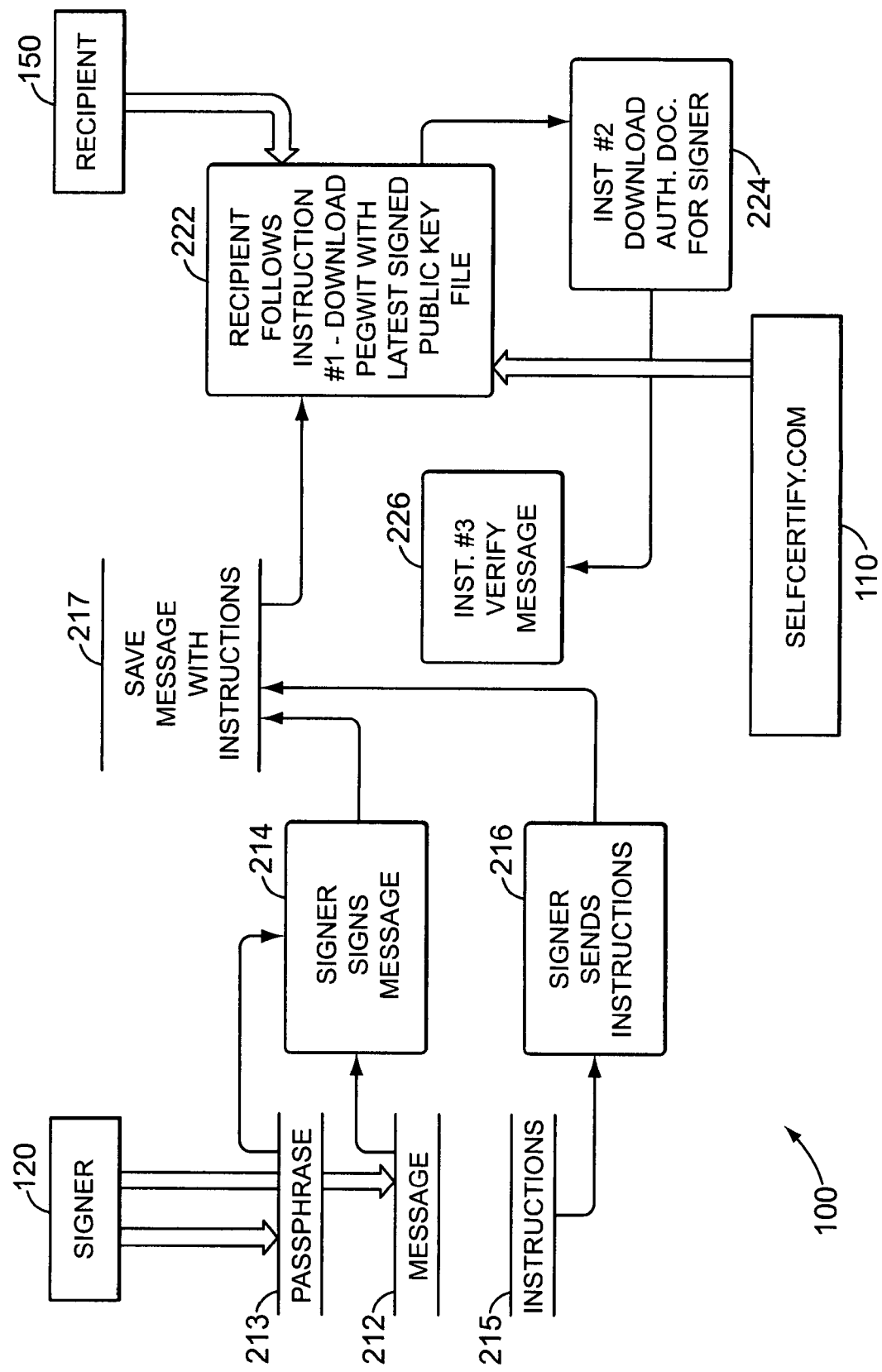
FIG. 2 illustrates a signing and verification procedure of the exemplary self-certification process of FIG. 1.

FIG. 2 illustrates a procedure 200 for signing and verification in the exemplary self-certification process. Signer 120, using passphrase 213, signs message 212 at 214, which is combined at 217 with instructions 215 sent by signer 120 at 216. At 222, recipient 150 obtains the signed message with instructions 217 and follows the instructions. First, recipient 150 downloads "PEGWIT" with the latest signed public key file. At 224, optionally because the key file is signed by SelfCertify.com, e.g., with PEGWIT or just SSL (FIG. 1, 134), the authentication document for signer 120 is downloaded. At 226, the message is verified.

An alternative method of authenticating a subscriber comprises having the subscriber agree to terms of the ACI (directly or by reference to an ACI displayed on a secure web page) in a recorded telephone conversation. See Appendix E of the application as originally filed for a disclosure of a technique for authenticating the recording.

One advantage of this method over the use of a holographically-signed paper ACI is that a person relying on the subscriber's digital signature is likely to know the sound of the subscriber's voice, and is thus likely to trust a recorded verbal agreement. SelfCertify.com can sign a digital file containing the recording (e.g., in compressed WAV format) as it can a PDF/TIFF file of a paper ACI. A recorded "verbal ACI" can have security features somewhat analogous to those of a paper document. For example, a synthesized voice can recite digits of the fingerprint of a public key certified by the ACI repeatedly throughout the entire recording, preferably with subdued volume.

The following is an example of subscriber authentication by a recorded telephone conversation.

Alice wishes to become a subscriber to Self Certify.com so that Bob will rely on her public key. However, she doesn't wish to go through the hassle of having a paper document sent to her and having it signed in the presence of a notary. She also wants people to be able to authenticate her public key by hearing a simple recorded statement by her. So, she chooses the "Verbal ACI" option on the SelfCertify.com web site and enters her phone number and the fingerprint of her public key into the form. The web site then lists a phone number and an access code and incites her to call the number.

She dials the number (making sure that the call blocking is disabled so that SelfCertify.com can detect the phone number she's calling from) and enters the access code using the touch tone keys of her telephone. She then enters into a brief oral exchange with a computer or human operator at Self Certify.com. The exchange goes something like the following in TABLE I below:

TABLE I

| | |
|---|---|
| SC | This telephone call is being recorded for the permanent records of SelfCertify.com, for the permanent records of SelfCertify.com, for the purpose of authenticating a public key you are certifying with SelfCertify.com. If you consent to this recording and proceeding with the certification process, please state "I agree" and then recite your full legal name and mailing address. |
| Alice | I agree. My name is Alice P. Costas, and my address is 537 Main Street, Anytown Arizona 12345. |
| SC | Now that we have your agreement to record this telephone call and proceed, we will ask that you carefully read that terms of the "Authentication and Certification Instrument." You will be asked to agree to the terms of that document. and your recorded verbal agreement will legally bind you to those terms as if you had signed that document with your ink signature. Please state "Yes, it is" to confirm with the statement entitled "Authentication Certification and Instrument" is now displayed on your web browser at https (colon, double forward slash) www.selfcertify.com/aci32776 and that the document refers to a public key with fingerprint 2355 7782 1193 8001. You will be given an opportunity to read the document in a minute if you haven't already done so. Right now, we just ask you to confirm that the document is being displayed. |
| Alice | Yes, it is. |
| SC | Now we will ask you to ensure that you have read the document. We recommend that you print the document for you records, as you will be bound to its terms if you proceed. Please say "I have read the document" when you have done so. |
| Alice | Yes, I've read the document. |
| SC | Now please confirm your legally binding agreement with the terms of the document entitled "Authentication and Certification Instrument," displayed on your web browser at https (colon, double forward slash) www.selfcertify.com/aci327776 and referring to a public key with fingerprint 2355 7782 1193 8001, on this (blank) day of (blank) (blank) by stating "Yes, I agree to the terms of the document." |
| Alice | Yes, I agree. |
| SC | Sorry, you need to state exactly, "Yes, I agree to the terms of the document." |
| Alice | Yes, I agree to the terms of the document. |
| SC | Thank you. This ends your verbal certification of your public key. Thank you. |

The recording then ends.

A cryptographic system usability enhancement of the inventions is signing an electronic record (e.g., MS WORD document, AUTOCAD drawing etc.) by "printing" that record to a special "virtual document printer." The "virtual signature printer" provides the user with an intuitive, simple way of authenticating an electronic record.

An example of a virtual printer is the "PDF Writer" printer driver that is installed with the ADOBE ACROBAT software. The inventive "virtual signature printer" provides the user with an intuitive, simple way of authenticating an electronic record.

The "virtual signature printer" system produces an output file (or multiple files, see below) that can be sent to a recipient for viewing, printing, and validation. The recipient can view or print the file (preferably, the file is backward compatible with widely available viewing software) and, with special software, can validate the signature on the file.

A particularly advantageous way of signing an electronic record that has been "printed" this way is with embedded signatures. However, a "virtual signature printer" system can employ any suitable technique for signing an electronic record. The following are some examples of output of such a system: (1) a PS or TIFF file (or, with suitable licensing if necessary, a PDF file) representing the document, accompanied by a detached PGP-compatible signature file; (2) a ZIP file containing a PS, TIFF, or PDF file representing the document including a ZIP comment containing a Base-64 PGP-compatible signature; (3) a PGP-signed file containing the document in a PS, TIFF, or PDF file.

When the signer wishes to electronically sign a document he or she can print the document to the virtual signature printer driver, using the print functionality of the software used to create the document. The printer driver creates a window in which the software requests the signer's authenticating information. The user can enter his or her passphrase, apply his or her fingerprint to a fingerprint scanner, insert a smart card, etc. The software then computes the digital signature for the document, based on the authenticating information or a private key unlocked by the authenticating information, and embeds the digital signature with an output file or includes the digital signature in a separate file.

The terms "virtual signature printing," "virtual signature printer" are to be broadly understood as including any mathematical construct, structure, method, system, etc., as the case may be, suitable for carrying out the function of authenticating an electronic record such as a word processor document by "printing" the document using a printer driver that does not actually produce printed output, at least not as its main purpose. Instead, such a printer driver according to various aspects of the inventions creates another file that includes, or references, indicia of the user's digital signature authentication of the electronic record.

"Print to Signed TIFF File" Process

According to various aspects of the present inventions, a document can be signed by printing the document to a TIFF file using a virtual printer driver, e.g. provided by a service such as "SelfCertify.com." (Note that Self Certify. com is not an operating business entity, though the applicant has registered the domain name, and has not offered any product or service for sale as of the filing date of the present provisional application.) The TIFF file is created as it normally would be except that includes a signature block within a suitable field.

In one embodiment, the signature block is included within the TIFF "ImageDescription" field, the ASCII contents of which are excluded from the signature calculation of the file. See the following table for a sample "ImageDescription" TIFF Field:

311. At 314, a signature for the resulting TIFF file is computed, with blanks in the TIFF "ImageDescription" field. At 316, the blank characters are replaced with the signature data. The result is a multi-page TIFF file 318 with a "comment" of the signature block.

The printer driver software of the virtual TIFF printer displays the TIFF file 318 of document 310 in a viewer window. The user interface of the viewer window requests authentication from the signer to apply his digital signature to the document. In exemplary process 300, a signature is computed at 314 based on a signing key 313. The authen-

TABLE II

| | |
|---|---|
| Tag | 270 |
| Type | ASCII |
| Count | Fixed number of characters in signature block, plus 1 for NUL at end. |
| Value | 1728 |
| | "-- SELFCERTIFY.COM SIGNATURE DATA -- ↵ |
| | Signed by: Edwin A. Suominen ↵ |
| | mQGiBDk8ZlMRBADZZ0behMne0qwL7mu7fa/KfbPx2wLtMSihh3Iit0o6o6e/twYQ ↵ |
| | 3Z27YlIlu9uvhIkdsBrQ7b+N0paKyJAu691eE5gzP8VEdzfLJtCQDXvdO9+H57Er ↵ |
| | PGicVujuGGIPxvzA7QuyxNxDzndKtFIGO60zn452pWrg/77iA+Ne0CYCuQCg/9I3 ↵ |
| | 6bNa0vfxxUV3CS+/PDo9VpED/jwquHOyJQYOi0jZNdaT9ZN8mzRQlPgfyGHuNBpp ↵ |
| | yoPRhck0nMe1BxNG83M2v243M0DUmabCPuGqq0tYKe5YLqAw/iM5IWwp3EctEHGU ↵ |
| | 48r8gC7rYKRHOLosyBfx6/uQkpGiNeM4TAI9QpqVzsbHvF1H5LSauLbHOSAwTUoM ↵ |
| | e/+uBACTQjV15XA+MPwaIx1vZ3lD2iEX/XFLOedxA5XzcN9uVlet+Chxd7xJn66x ↵ |
| | w0xzdVLvb/kCdcNY8idJkJVqAUx249S+PymCQFR+sX0pxXCVky4JgtLDToX0wW1G ↵ |
| | 6C0kPzUR1AH9jdAUaPc+7SC1TdixmOPsLR1l+5PzUUVhNj6b8bQgRUFTIEp1bmUg ↵ |
| | MjAwMCA8ZWRAZWVwYXRlbnRzLmNvbT6JAFQEEBECABQFAjk8ZlMFCQAiRwAECwMC ↵ |
| | AQIZAQAKCRCRZ8BksUXUY2Y3AKCG99iXRgxGmOssyOC0Lwm/U0yECACfW6R9rI2f ↵ |
| | G+UeNOWE/b2TJDt49La5Ag0EOTxmUxAIAPZCV7cIfwgXcqK61qlC8wXo+VMROU+2 ↵ |
| | 8W65Szgg2gGnVqMU6Y9AVfPQB8bLQ6mUrfdMZIZJ+AyDvWXpF9Sh01D49Vlf3HZS ↵ |
| | Tz09jdvOmeFXklnN/biudE/F/Ha8g8VHMGHOfMlm/xX5u/2RXscBqtNbno2gpXI6 ↵ |
| | 1Brwv0YAWCvl9Ij9WE5J280gtJ3kkQc2azNsOA1FHQ98iLMcfFstjvbzySPAQ/Cl ↵ |
| | WxiNjrtVjLhdONM0/XwXV0OjHRhs3jMhLLUq/zzhsSlAGBGNfISnCnLWhsQDGcgH ↵ |
| | KXrKlQzZlp+r0ApQmwJG0wg9ZqRdQZ+cfL2JSyIZJrqrol7DVekyCzsAAgIH/0V8 ↵ |
| | DY5pj51RDGsakRhMebL9Ob7v9GsbZN6PfTgO2upuCi6WUyazabw4J4ZFc7vtpo8x ↵ |
| | FQOkCofOLmisNim7r0PyWrW0SgHLbcXwMMUUb1h/QbggH0WtkkJTzxgNGL+MLJZa ↵ |
| | ND4R0gle03PQep4SZgA6/x9OUGWStmzWEt3jk/VdnImS5gDJmNHmCX7+ZaCxROiL ↵ |
| | zO3oDmzIRpVYk3+tnekDVhhrDwX5lQ1zUoCg43hAmA1Q1/KNFBw/qiol0EvLyJby ↵ |
| | hUzhGqdzd/MJkNHXviOoJyuOnQH+O8lEME5S2Ej19epf4Rfuf9rn8uR7tl3YEraD ↵ |
| | wqwO4VIcd5n+6F3199GJAEwEGBECAAwFAjk8ZlMFCQAiRwAACgkQkWfAZLFF1GMG ↵ |
| | KwCZARTQgJDOM40GBp0OJwP1escVP/gAoPIJb/gmbNpbeQmG9UobWiT8PKl1 ↵ |
| | =zFrB ↵ |
| | ↵ |
| | Signature: ↵ |
| | iQA/AwUAOhs1jKmKuMvNCWDGEQJ4TACeJpwTCOzNvxKhZVYag17lBEuhKEMAnjtT ↵ |
| | SivKAZgC21P/pMrro2HgTfJo ↵ |
| | =Adug<NUL>" |

In an actual implementation, the user "prints" the document to the digital signature printer driver. The driver will creates the TIFF (multi-page if necessary), with blank characters in the fixed-length "ImageDescription" field where the signature data is intended to reside (setting that data to a default blank ASCII value), compute signature for the entire document with the default blank value in the "ImageDescription" field, and place the signature data in the "ImageDescription" field as ASCII.

The document's signature can be verified simply by opening it with a customized TIFF reader, which extracts the signature data from the "ImageDescription" field and validate it against the data of the document with default blank values substituted in the "ImageDescription" field.

Figure 3:
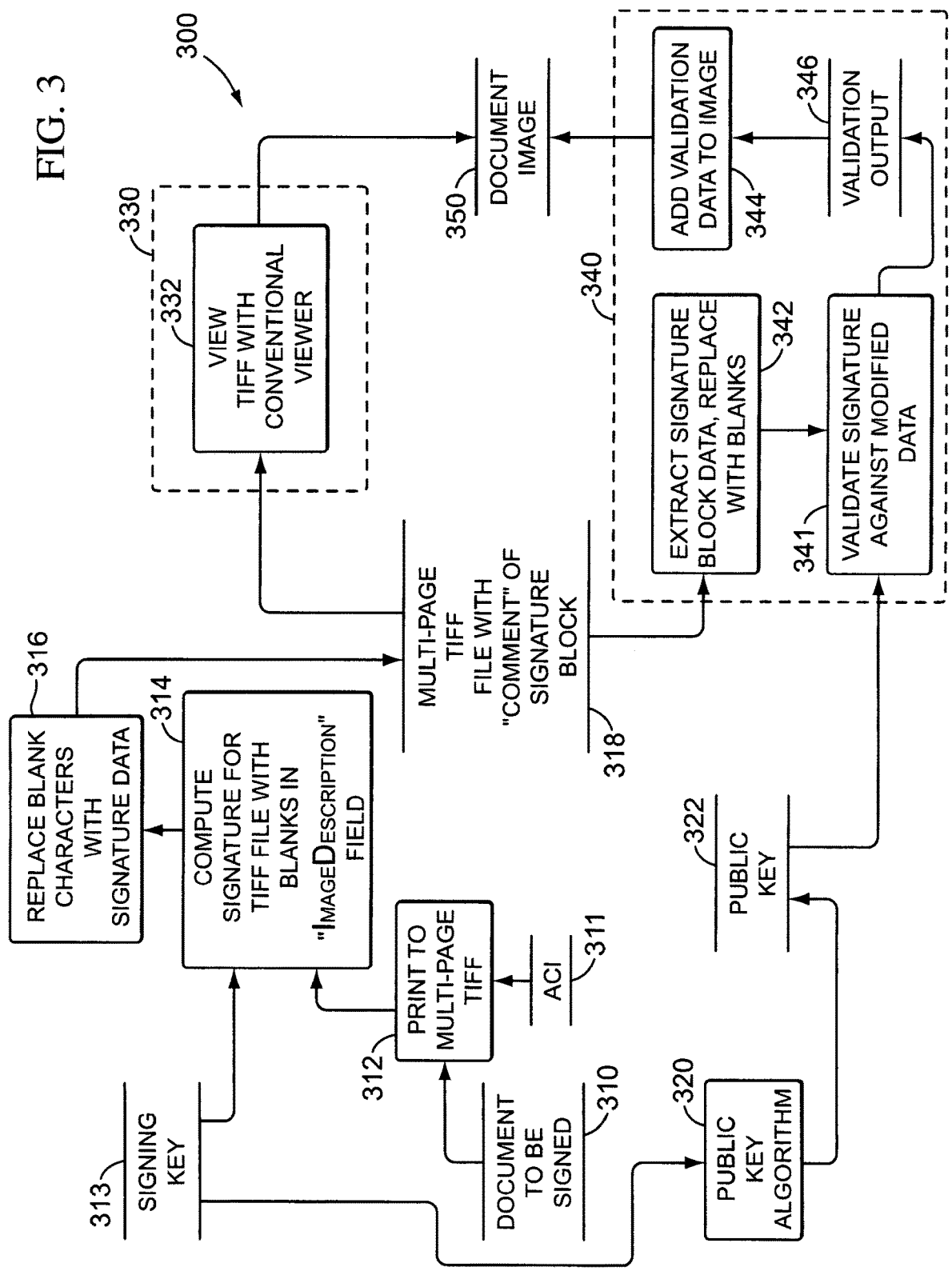
FIG. 3 illustrates an exemplary process for signing a document by printing to a TIFF file using a virtual printer driver, with a signature block contained within a suitable field of the TIFF file.

An exemplary process 300 is illustrated in FIG. 3, in which a signer creates a document 310 using whatever software he (or she) wishes to use (e.g., MICROSOFT WORD 97). At 312, he or she then prints document 310 to the SelfCertify.com virtual TIFF printer, optionally with ACI tication can be a securely delayed passphrase input according to various aspects of the present inventions.

Advantageously, the signed document 318 is in a conventional format (e.g., multi-page TIFF) that can be read by any conventional viewer if signature authentication is not needed. When signature authentication is needed, a document can be viewed using the SelfCertify.com TIFF viewer, which may be distributed freely to encourage use of SelfCertify.com's digital signature services.

At 320 in process 300, a public key algorithm generates a public key 322, which is used for signature validation at 341 of path 340, as discussed below. The signer's public key 322 can be included in the signature data along with the digital signature and the name of the signer. A facsimile copy of the key ACI (see, e.g., Appendix A) can be appended to the end of TIFF file 318 after the document pages.

Having both of those items present in the TIFF file permits a verifier to quickly authenticate the signed document. If he or she is satisfied with the integrity of the TIFF reader/verification software he or she has obtained (e.g., from a secure, trusted web page of SelfCertify.com), and if he or she is satisfied that the facsimile copy of the ACI with its security background digits is not a forgery, he will have everything he needs to validate the signature of a person who has not made any prior digital signing arrangements with him.

Signing and verification software according to various aspects of the present inventions can be integrated with the GPG ("GNU Privacy Guard") software, which can be freely distributed and modified under the GNU Public License. The signing and verification software can call the GPG software with parameter passing. The inventive signing and verification software can thus include, generally, a slightly modified TIFF printer driver and TIFF reader that calls the GPG software for all digital signature functionality. All three pieces of software can be released in a single compact package.

The TIFF reader software can provide the option to output the original TIFF file (without signature data in the "Image-Description" field) along with a PGP-compatible detached signature to the file and an ASCII file with the signer's public key. This permits less trusting users to verify integrity of the signature and signing key (comparing PGP's SHA-1 "fingerprint" to what's shown on the ACI) with their own copy of PGP or GPG.

In one path 330 of exemplary process 300, signed TIFF file 318 is viewed as document image 350 with a conventional TIFF viewer, at 332. As discussed above, the TIFF format of file 318 permits such viewing. Validation of the signature, on the other hand, occurs in path 340 of process 300 at 341, 342, 344.

At 342, signature block data is extracted from file 318 and replaced with blanks. An alternative is to use a conventional TIFF file with a detached PGP signature, e.g., in a ZIP file. At 341, the signature is then validated against the modified data and the public key 322 generated from signing key 313. Validation output 346 of that act is used at 344 to add validation data to the image of file 318 before viewing it as document image 350.

Existing technology can be used to print and sign documents according to various aspects of the present inventions. For example, the "PEERNET.DRV TIFF Driver converts any document capable of being printed by a windows application into high quality serialized or multi-page TIFF images. It is ideal for imaging or archiving applications. It's also a handy file-generation tool for cross-platform article distribution. TIFF conversion is as fast as printing. Document scanning is obsolete. Paper waste is a thing of the past" (Appendix AE-5 of the application as originally filed).

Another example of existing TIFF generation technology that may be adapted for use according to various aspects of the present inventions is the "EZ-Printer for Windows NT," which "makes it possible to print from any application to an image file. It installs itself as a native device in the printer control panel. Users can simply choose Print and select the EZ-Printer printer from the list of available printers" (Appendix AE-6).

Other cryptographic system usability enhancements are an embedded signature where indicia of signature are placed within a graphical (image-based) representation of an electronic record, and preserving formatting (e.g., font size, boldface, underlining, etc.) of clear-signed text. For example, a clear-signed document can have a simulated digital signature (25×13 bits=325 bits) that resides as a graphic within a signature block that is excluded from the signature calculation of the document. In an actual implementation, the user will place the signature block in the document and will then "print" the document to the digital signature printer driver. The driver will then create a graphic file such as a TIFF (multi-page if necessary), remove the graphics in the region where the signature block will go (setting that graphic data to a default blank value), compute signature for the entire document exempt the signature region, and place the signature data in the region as graphic-mode text.

The document's signature can be verified simply by opening it with a customized TIFF reader, which will detect the presence of the signature region and will validate the signature within it against the data of the document except the graphics within the signature block. An option can be provided to put the signature data on an entirely separate page of the document (e.g., after the last page), preferably with a facsimile copy of the signer's ACI. (In such embodiments, the ACI should have a blank space for the signature data of the document signed with the ACI's signing key.)

Figure 4:
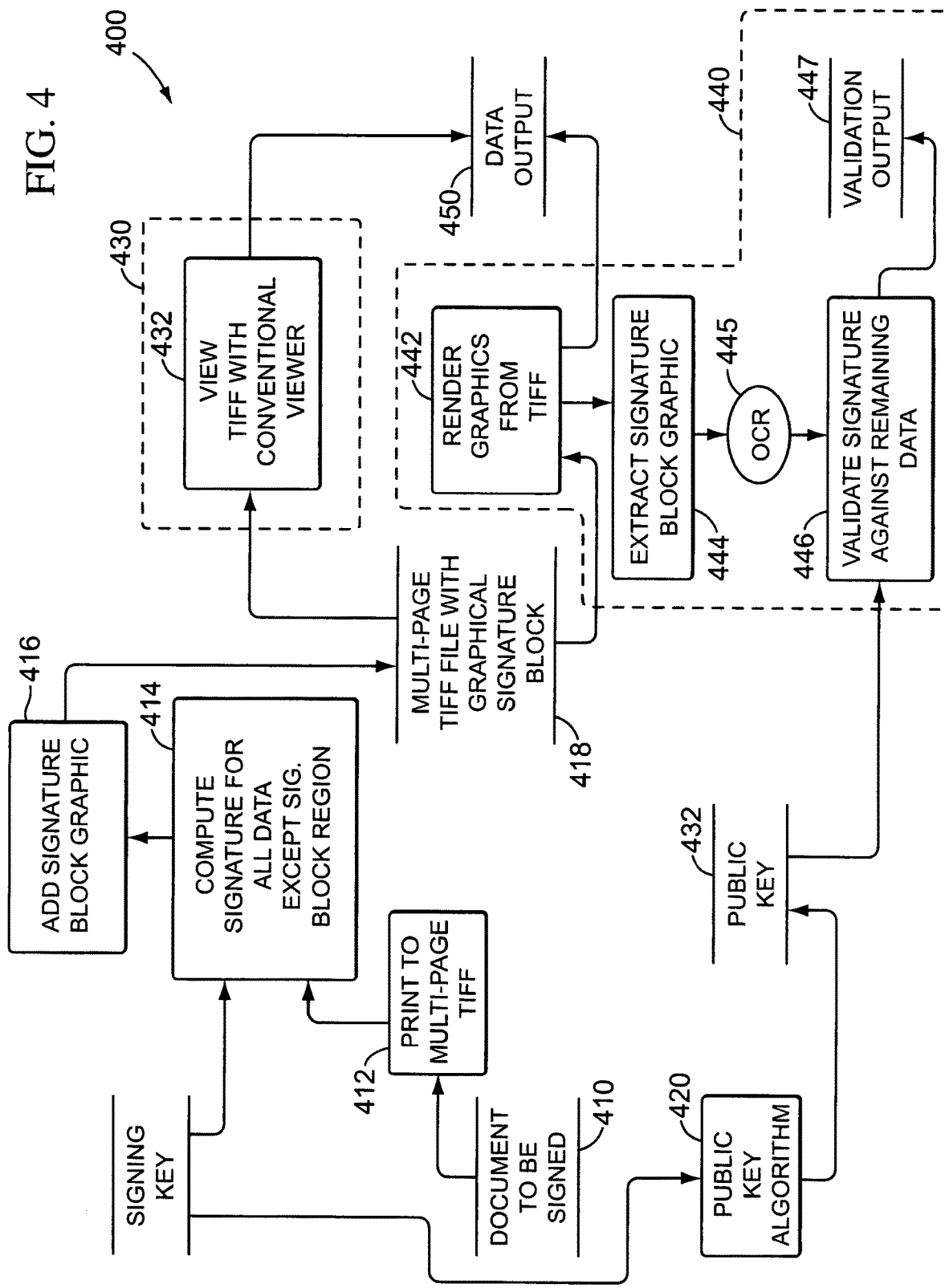
FIG. 4 illustrates an exemplary process for digitally signing a document by virtual printing to a modified TIFF file with a graphical signature block.

An exemplary process 400 is illustrated in FIG. 4, in which a signer creates a document 410 (e.g., a letter) using whatever software he (or she) wishes to use (e.g., MICROSOFT WORD 97). At 412, the signer prints the document to the SelfCertify.com virtual TIFF printer, which acts as a "software signature machine." The printer driver software creates a TIFF file of the document and displays it in a viewer window. The user interface of the viewer window requests that the signer select a graphical region within the displayed document for application of the signer's digital signature "stamp."

The user can specify the region by moving a dashed box around the screen, as illustrated in FIG. 5. Dashed box 510 appears over text of a document to be signed 500. Dashed box 510 includes left and right arrows 512, 514 within it for navigating to different pages of a multi-page document, and a "sign here" (or "OK") button 516 for applying the digital signature "stamp" at the current location of the box. FIG. 5 shows what box 516 might look like as it is moved around during the selection process.

The user interface further requests authentication from the signer to apply his digital signature to the document within the digital signature "stamp" at the selected location. As discussed below, the authentication can be a securely delayed passphrase input.

FIG. 4 illustrates an exemplary process 400 for digitally signing a document 410 by virtual printing to a modified TIFF file with a graphical signature block 418. When the signer has selected the location of the digital signature stamp and provided authentication for its creation (a signing key 413 is employed in exemplary process 400), the printer driver software performs operations at 414 (FIG. 4). It removes all graphic information from the selected location and then computes the digital signature based on (1) the remaining data of the TIFF file (exclusive of the location of the stamp) and (2) the signer's private key.

FIG. 6 illustrates document 500 after a digital signature stamp 600 graphic has been added at 416. Signature data of stamp 600 is in the form of groups of four decimal digits. Alternatively, signature data can be in the form of a bar code (1D or 2D) and could include signature characters as data (not image pixels), making search a very simple search for key tag characters in the file.

Advantageously, the signed document 418 is in a conventional format (e.g., multi-page TIFF) that can be read by any conventional viewer, at 432 in path 430 of process 400 (FIG. 4), if signature authentication is not needed. When signature authentication is needed, a document can be viewed using the Self Certify.com TIFF viewer (which may be distributed freely to encourage use of SelfCertify.com's digital signature services) in path 440 of process 400.

At 442, graphics are rendered from TIFF file 418 and provided to 444 as well as data output 450. At 444, signature block graphic 600 (FIG. 6) is extracted. OCR is performed on the result, at 445, and the OCR result is used to validate the signature of document 410 against remaining data of file 418, at 446. Path 440 of process 400 provides validation output 447 in addition to data output 450.

To verify the digital signature of file 418, the viewer first searches the graphical rendering of the signed document provided at 442 for the distinctive graphical outline of the signature block, at 444. Distinctive features of the graphical outline can include (1) a distinctive color such as maroon, (2) a distinctive line shape such as double parallel lines, and (3) a distinctive line weight such as 3.2 points (not an integer or x 0.5 fraction). All of those distinctive properties are present in simulated signature block 600 for document 500 (FIG. 6). In addition, the signature block can have a predetermined size to further identify it.

Once the viewer software has identified the exact location of the signature block, it removes all of the graphical data of the signature block (up to and including the border) and sets it to the default blank value that was used during the signature calculation performed at 414. At 445, it performs an optical character recognition of the signature data within the block to obtain the value of the digital signature. According to advantageous aspects of the invention disclosed below, the digital signature can be applied to a secure delay to obtain another, larger digital signature value. The digital signature value (as shown in FIG. 6 or as expanded through a secure delay) is then validated against the modified TIFF representation of the document.

Other aspects of the invention are preserving formatting (e.g., font size, boldface, underlining, etc.) of clear-signed text and employing an unobtrusive digital signature around the clear-signed text, as illustrated in FIG. 7. A digital signature can be made unobtrusive in a number of different ways. One way is to use a small, distinct font (e.g., 8 point Courier) for the Base-64 encoded signature characters, as in block 710 of clear-signed email 700.

Another way of making a digital signature unobtrusive is to omit the "header" that tells conventional digital signature software where to start looking for the beginning of clear-signed text. In the inventive alternative to such a header, the signature block (at the end of the clear-signed text) includes the number of characters in the clear-signed text, which allows the digital signature software to "count backwards" from the end of the clear-signed text until it reaches the beginning or that text. Another way a digital signature can be made unobtrusive is using a white font color to hide the signature characters entirely.

Another cryptographic system usability enhancement is graphical (mouse) input of "CVCVCVCV" passphrase digits. FIGS. 8-12 illustrate screen shots of a secure system according to various aspects of the invention for graphical entry of a "CV" passphrase, illustrating an exemplary user interface at different points during the input of a passphrase without the use of keystrokes. Thus, the security hazard of keystroke loggers can be avoided. In addition, the mouse-based input method may be preferred by users over the use of a keyboard, for example when they are entering their passphrase to browse encrypted e-mails or files. In an experiment the applicant carried out, "entering" the passphrase by the mouse input methods (simulated by tapping a pen onto a printout similar to FIGS. 8-12) did not take him much longer than typing in the passphrase.

A "consonant-vowel" ("CV") passphrase of repeated pairs of consonants and vowels provides a user-friendly representation of a high-entropy data word. The consonants are preferably selected to be phonetically and visually distinct. The set of consonants {b,d,g,h,k,l,m,n,p,r,s,t,z} has particular advantages. The use of "pseudowords" created from four adjacent CV pairs is particularly advantageous because the "pseudowords" are pronounceable and have a linguistic look and sound.

Figure 8:
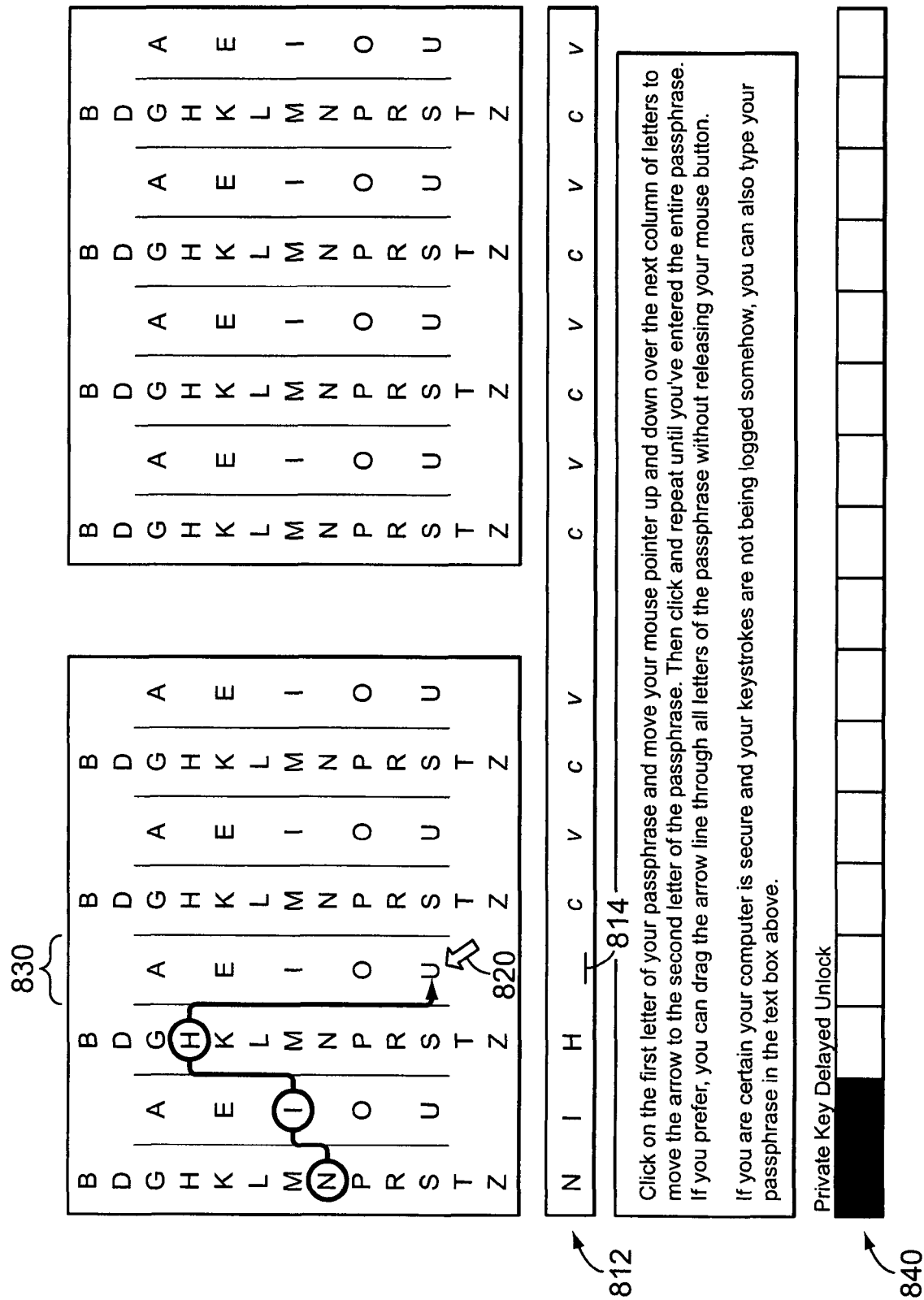
Figure 9:
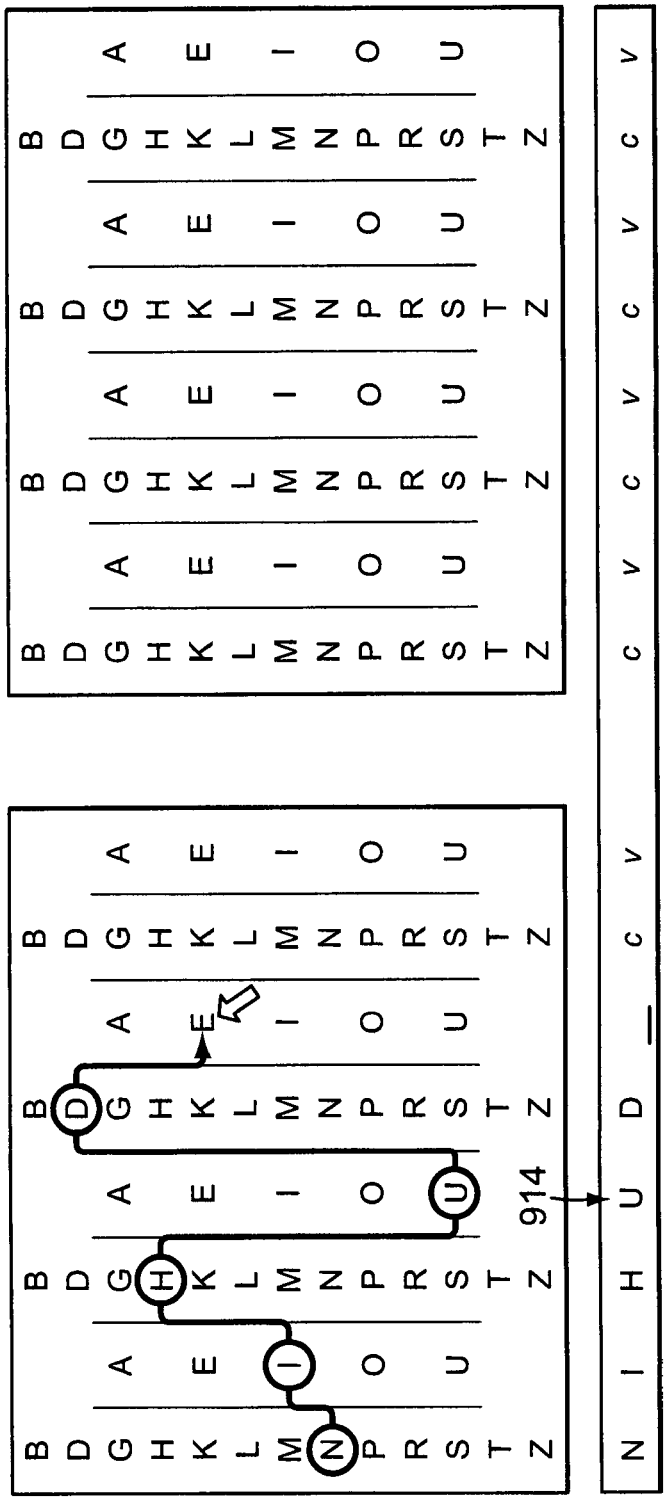

In FIG. 8, letters "NIH" have been entered (812) and mouse pointer 820 is near the letter "U" in a column 830 containing the letters AEIOU. In the view of FIG. 9, the letter "U" is entered (914) where only an underscore 814 is present in the view of FIG. 8. A "private key delayed unlock" bar 840 has 2/17 of its length filled in.

Figure 11:
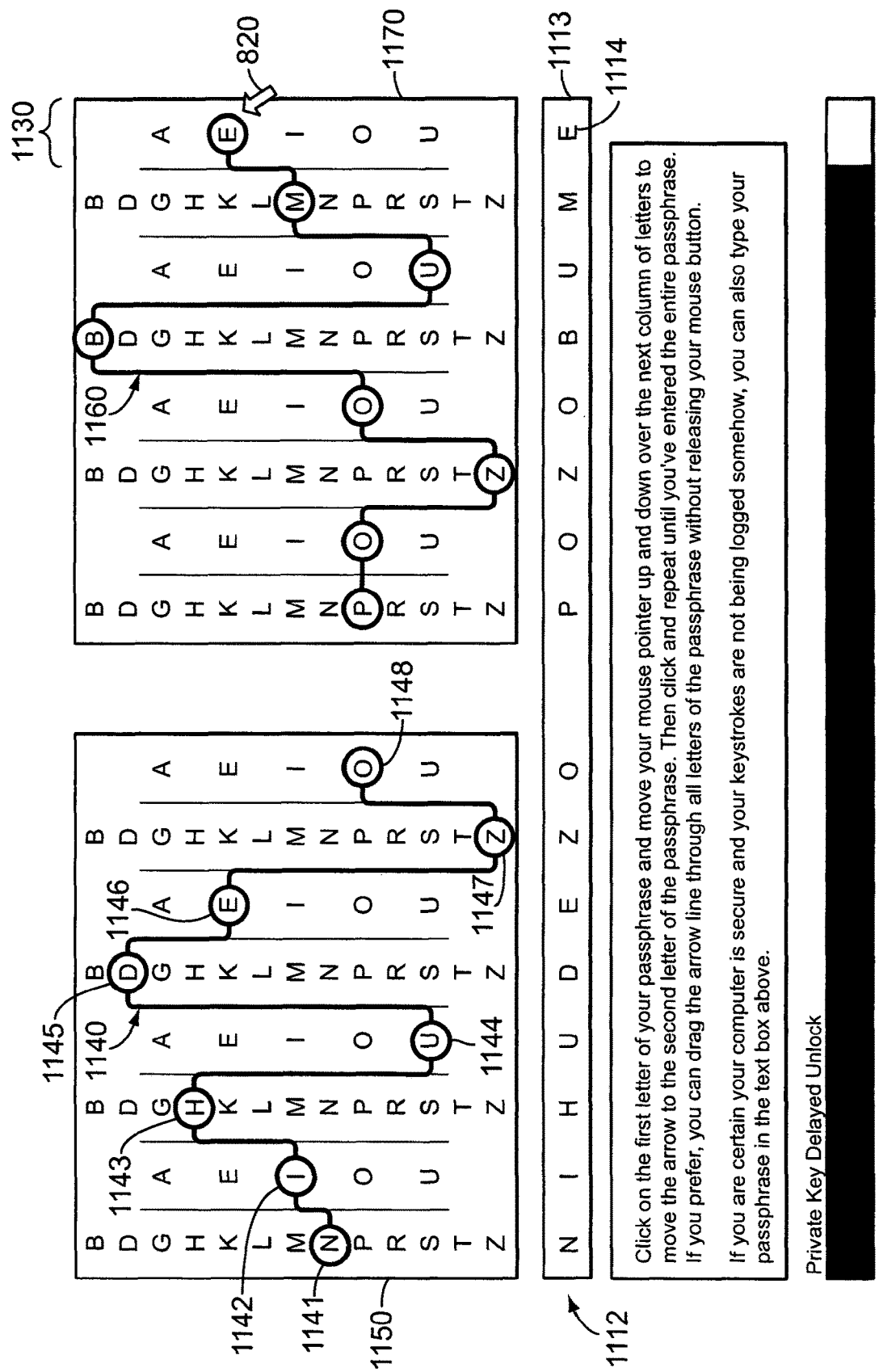

In FIG. 9, letters "NIHUD" have been entered (912) and bar 840 is 4/17 filled in. In FIG. 10, letters "NIHUDEZO PO" have been entered (1012) and mouse pointer 820 appears over the letter "Z" in a column containing the letters BDGHKLMNPRSTZ. Bar 840 is 9/17 filled in at this point. In FIG. 11, letters "NIHUDEZO POZOBUME" have been entered (1112), filling box 1113. Mouse pointer 820 is near the letter "E" in the right-most column 1130, and that letter appears (1114) as the last letter in box 1113.

Advantageously, the passphrase is represented in the illustrated embodiment (as it is entered) both as circled letters and as a pair of stair-stepped line segments having characteristic shapes. (FIG. 11 illustrates a stair-stepped line segment 1140 in one box 1150, connecting circles around letters 1141-1148, and another stair-stepped line segment 1160 in a box 1160 to the right of box 1150.) Viewing the passphrase and its associated characteristic shapes of the line segments helps the user to remember the passphrase. Human brains are good at remembering pronounceable words (even when they are nonsense words) and are also good at remembering characteristic shapes. The combination of both characteristics of a unique passphrase can be expected to improve the user's ability to remember it when the time comes to input the passphrase.

Figure 13:
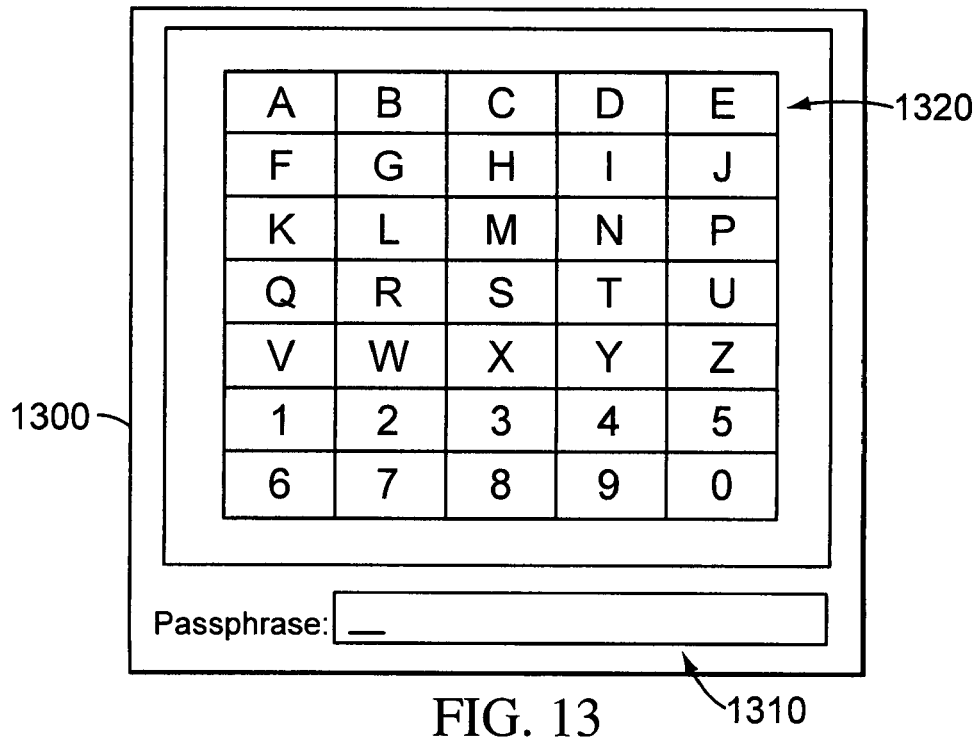
FIGS. 13-14 illustrate graphical (mouse) input of "Alphanumeric-Except-O" passphrase digits in a 7×5 grid, with already-selected selected digits indicated.
Figure 14:
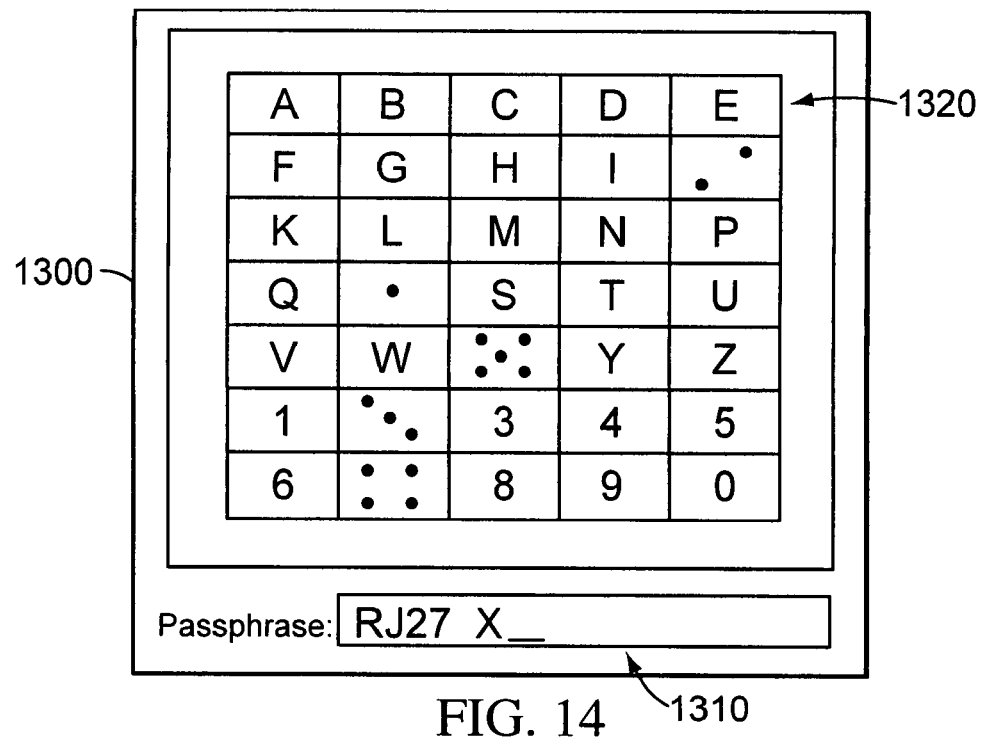

Another graphical (mouse) input usability enhancement is the entry of "Alphanumeric-Except-O" passphrase digits in a 7×5 grid. FIGS. 13-14 illustrate a particularly advantageous passphrase entry system using this "Alphanumeric-Less-O" passphrase type.

In FIG. 13, a box 1300 contains a grid 1320 with the letters A-N and P-Z, and all the decimal digits 1-9 and zero. That arrangement is particularly advantageous because the digits can be displayed in a 7×5 matrix (grid 1320) and confusion between the letter "O" and zero is avoided. In a variation, an entry system is built into a keypad of a USB-connected hardware delay processor. Already-selected digits can be illuminated.

FIG. 13 illustrates a "passphrase:" box 1310 displaying an underscore but no entered digits. FIG. 14 illustrates box 1300 after entry of the digits "RJ27 X," which appear in box 1310 followed by an underscore. Those already-selected digits are indicated in grid 1320 by having been replaced with images depicting one, two, three, four, and five dots.

FIGS. 13-14 are excerpted from Appendix AB of the application as originally filed. As illustrated in AB-1, an image depicting a single dot replaces the letter "R" in grid 1320 when that letter has been entered in box 1310. As illustrated in AB-2, an image depicting two dots replaces the letter "J" when that letter has been entered in box 1310, and an image depicting three dots replaces the decimal digit "2"

when it has been entered in box 1310. As illustrated in AB-4, an image depicting four dots replaces the decimal digit "7" when it has been entered in box 1310. AB-4, AB-5, and AB-6 illustrate the replacement of "X," "Q," "H," and "3" by images depicting five, six, seven, and eight dots, respectively, when those letters and decimal digits have been entered.

An analysis of entropy using the preferred non-repeating digits in the system of FIGS. 13-14 is found in Appendix AB. With 7×5=35=M choices and N=8 non-duplicate digits, the number of possibilities X=M·(M−1)·(M−2)·(M−3) . . . (M−N−), which works out to X=6.67×10$^{14}$. Based on the base 2 log of X, the result is 49.2 bits of entropy. With a 0.5 second delay between digits, d=4 seconds, and 4×/(3600 sec./hr×24 hr/d×365 d/yr)=84,496,818 years.

Returning to the secure passphrase entry system of FIGS. 8-12, box 1113 is completely filled in FIG. 11 but "Private Key Delayed Unlock" bar 840 is 16/17 filled. In FIG. 12, bar 840 is completely filled and box 1113 displays "Passphrase confirmed. Your signature has been applied."

A secure delay system with step-by-step delay processing according to another aspect of the invention, illustrated in the block diagrams of FIG. 13-14, makes a secure delay according to various aspects of the invention unobtrusive to the user. It does so by beginning the delay process when the passphrase has been partially entered.

Advantageously, such a system performs the delay computations substantially in parallel with the unavoidable delay of the user's input of the passphrase. Even when typing quickly, it took the applicant at least about three seconds to enter the passphrase during the experiment mentioned above. This is a substantial period of delay that, when made computationally unavoidable, makes cracking the 2$^{48}$ possible combinations of the randomly chosen passphrase nearly impossible with the computing horsepower available around the date of filing of the present application. (See Appendix Z9 and Z10 of the application as originally filed for a detailed computational analysis.)

By performing delay processing in steps and incrementally accepting user input (or displaying user output), the secure delay can provide the security benefit of increased intractability to an attacker without creating any noticeable inconvenience for the legitimate user. A secure-delayed passphrase entry system can process each keystroke (or graphical digit selection) input to produce succeeding delay output values, each of which is used as the initial value for the subsequent secure delay processing of the next input. A secure-delayed hash output system can display sub-hashes of an iteratively updated delay output value so that the user can visually compare digit clusters (e.g., "1234", "X7J", "zasadabi") while the secure delay is running.

The screen shots of FIGS. 8-12 show the "private key delayed unlocking" beginning with the first consonant-vowel pair entered by the user. The delayed unlocking (the inventive "computationally unavoidable" delay) continues substantially in parallel with the user's input of additional consonant-vowel pairs. Note FIG. 12, in which the passphrase is confirmed and the private key has been completely unlocked.

An element of the inventions is a processing-induced secure delay interposed between an input and output that transforms a given input value into an unpredictable but deterministic output value. Both terms are subject to minor deviations from exactness. An output is "unpredictable" when it is computationally infeasible to predict, given computing resources that could reasonably be expected to be brought to bear against the problem. An output is "deterministic" when it is consistently the result given a particular input, except perhaps for rare errors or imperfections in algorithms that do not have a significant negative impact on performance.

In system 1500, a passphrase entry user interface 1510 accepts eight consonant-vowel pairs over 3-10 seconds of user input. Each pair is a set with 13×5=65 members, which block 1520 transforms to a set "A" whose members are the integers from zero to 64. The output of block 1520 is a seven-bit word, applied to one input "A" of block 1530.

Public key and private key pair generator 1538 connects to block 1532 via user's public key 1540. Block 1532 generates a 121-bit "fingerprint" hash of user's public key 1540 and applies it to a second input "B" of block 1530.

The (A,B) output of block 1530 is applied to a secure encryption and delay block 1550. Using an inventive indexed key lookup, block 1550 operates with a number of cycles selected to give about a third-second delay on the user's machine. A third-second delay multiplied by eight (the number of times block 1550 iterates, the number of consonant-vowel pairs accepted by user interface 1510) totals about 2.5 seconds and is not very noticeable.

Figure 16:
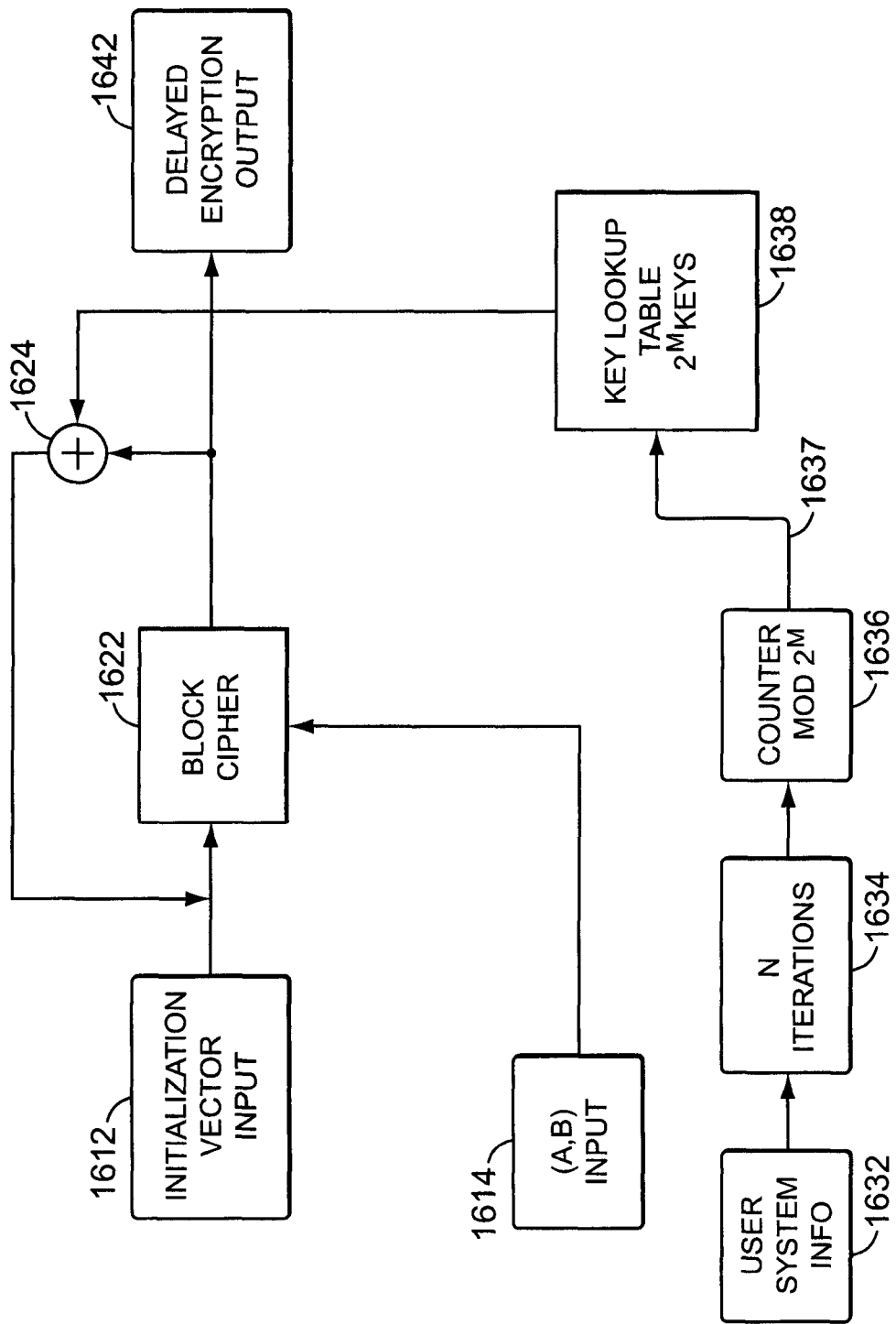

FIG. 16 illustrates a block cipher 1622 that accepts initialization vector input 1612 and (A,B) input 1614. (Initialization vector input 1612 is fixed for the first consonant-vowel pair processed, and is the result of the previous consonant-vowel pair for the others.) Block cipher 1622 produces delayed, encrypted output 1642 that is also sent to an XOR 1624 along with output of a key lookup table 1638.

Key lookup table 1638 has 2$^M$ keys. User system info 1632 is applied to N iterations 1634, the output of which is applied to a counter mod 2$^M$ 1636. The M-bit output of counter 1636 is applied to key lookup table 1638. Regarding key lookup table 1638, truly random is best for preventing an attacker from computing keys on the fly (to avoid using memory).

Figure 15:
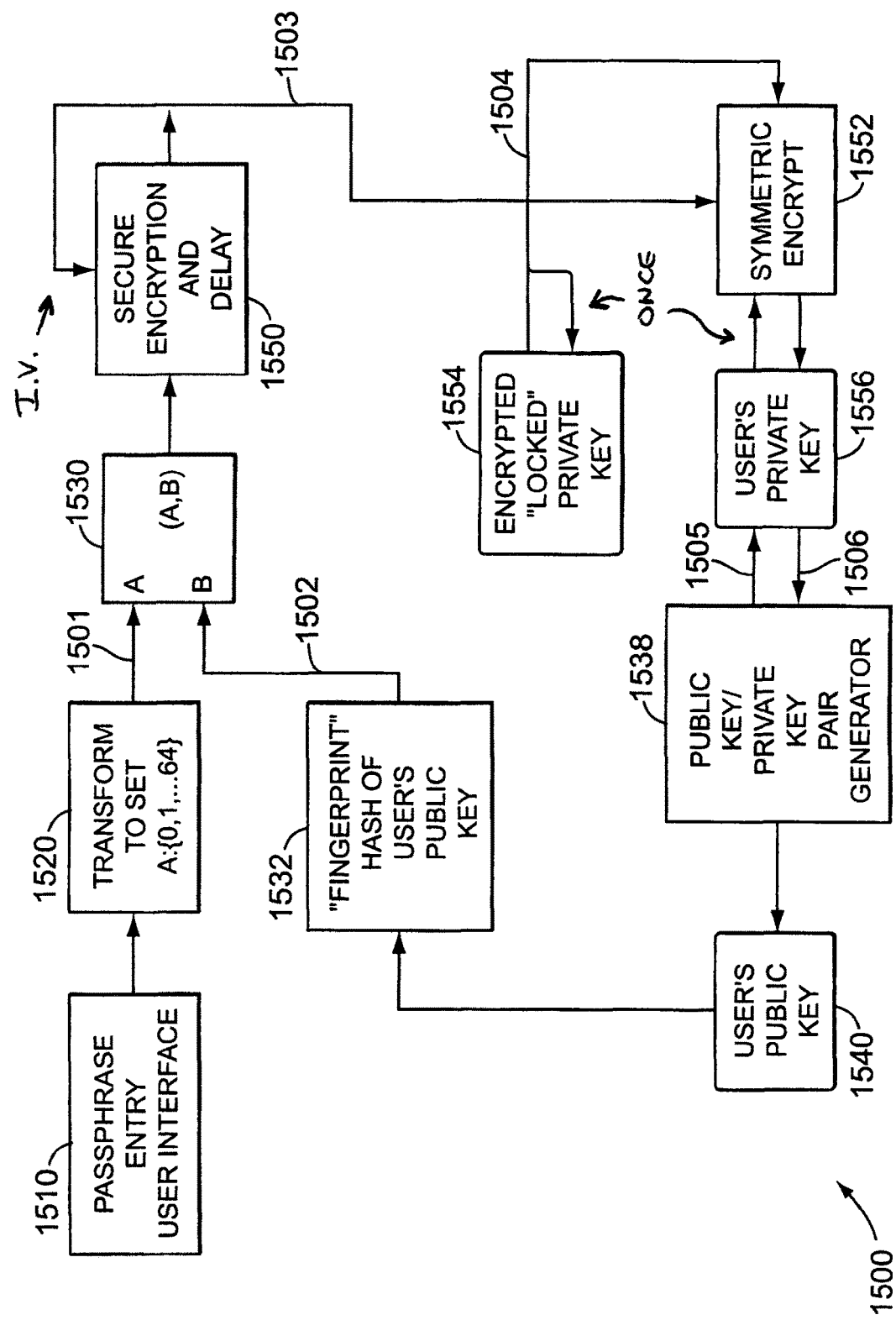
FIGS. 15-16 are block diagrams illustrating a delay system according to an aspect of the invention.

Returning to FIG. 15, public key and private key pair generator 1538 sends "once" output 1505 to user's private key 1556. (Generator 1538 also receives "many" input 1506 back from user's private key 1556.) User's private key 1556 is very sensitive and never stored anywhere. Symmetric encryption 1552 accepts an input ("once") from user's private key 1556, and another "once" connection goes to encrypted "locked" private key 1554.

Encrypted "locked" private key 1554 produces an output that symmetric encryption 1552 accepts as an input. Symmetric encryption 1552 also accepts as an input "k" the output of secure encryption and delay block 1550, which also serves as an "IV." input back to block 1550. Symmetric encryption 1552 produces an output ("many") that goes back to "never stored anywhere" private key 1556.

User's public key 1540 is publicly available. Encrypted "locked" private key 1554 could be public, too, in view of the passphrase and secure delay security of system 1500.

A secure delay according to various aspects of the present inventions can be applied in other areas than just passphrase security. For example, a hash value can be run through a secure delay to produce a smaller hash value that would be computationally infeasible to derive based on a birthday attack. In one embodiment, a 160-bit hash value is repeatedly run through a secure delay for a predetermined number of iterations that, given a security selection, corresponds to an acceptable unit delay. (An example of an acceptable unit delay is one second.) At the end of each unit delay, a sub-hash is computed from the current output of the secure delay and displayed. A person wishing to compare hash values can begin comparing a first group of digits corresponding to the first sub-hash after the first unit delay, and while the second unit delay is underway. When the person looks for the second group of digits to compare, the second unit delay (when optimally chosen) is already completed and the third unit delay is underway.

Thus, a securely delayed hash system according to various aspects of the inventions can provide a smaller hash value with the same security as the larger hash value from which it is derived. The loss in entropy in the smaller value is offset by the computational difficulty (from the secure delay) of obtaining the smaller value. An attacker wishing to find a larger hash value that produces the smaller hash value will need to run the secure delay, on average, N2/2 times with the secure delay computation for each iteration.

If T=delay time (on an equivalent processor as that of the legitimate user), then T2=T*N2/2. If T=1 second, and the required T2=1,000,000 CPU years, then the required N2 is approximately equal to $2^{21}$, a much smaller value than, say, $2^{160}$.

Since a hash value is not particularly sensitive, it can be sent freely over in secure networks. It is conceivable that an Internet site can be established for quickly computing smaller "sub hashes" based on transmitted hash values through an open-source, standardized secure delay algorithm. However, applicant believes it more likely that the market will demand simplicity and standardization, and an average delay within the reach of the average desktop PC. The remote-computation model may be useful for portable computers, though.

The implementation of a secure delay with a pseudogroup operation is a particularly advantageous combination according to one aspect of the inventions. As discussed in greater detail below with reference to FIG. 18, a pseudogroup operation according to various aspects of the present inventions dispenses with the need for the modulus p to be fixed with respect to the order of the input and output set in an operation of the type xy modulo p. As discussed in greater detail below with reference to FIG. 18, a pseudogroup operation according to various aspects of the present inventions dispenses with the need for the modulus p to be fixed with respect to the order of the input and output set in an operation of the type xy modulo p. Advantageously, the modulus can be chosen as whatever prime number is closest to the set order—above it or below it. As may be better understood with reference to Appendix J-5 of the application as originally filed, for example, two advantageous modifications of the IDEA cipher according to the inventions employ, in one case, a modulus $2^{15}$ greater than $2^{32}$, and in another case, 5 less than $2^{32}$ to encrypt a block of binary data in the set $\{1, 2, \ldots 2^{32}\}$. TABLE III below lists exemplary prime numbers for various bit lengths.

TABLE III

| | |
|---|---|
| $2^{20} + 7$ | $2^{20} - 3$ |
| $2^{32} + 15$ | $2^{32} - 5$ |
| $2^{16} + 3$ | $2^{16} - 15$ |
| $2^{18} + 3$ | $2^{18} - 5$ |
| $2^{19} - 1$ | |
| $2^{28} + 3$ | |

Figure 17:
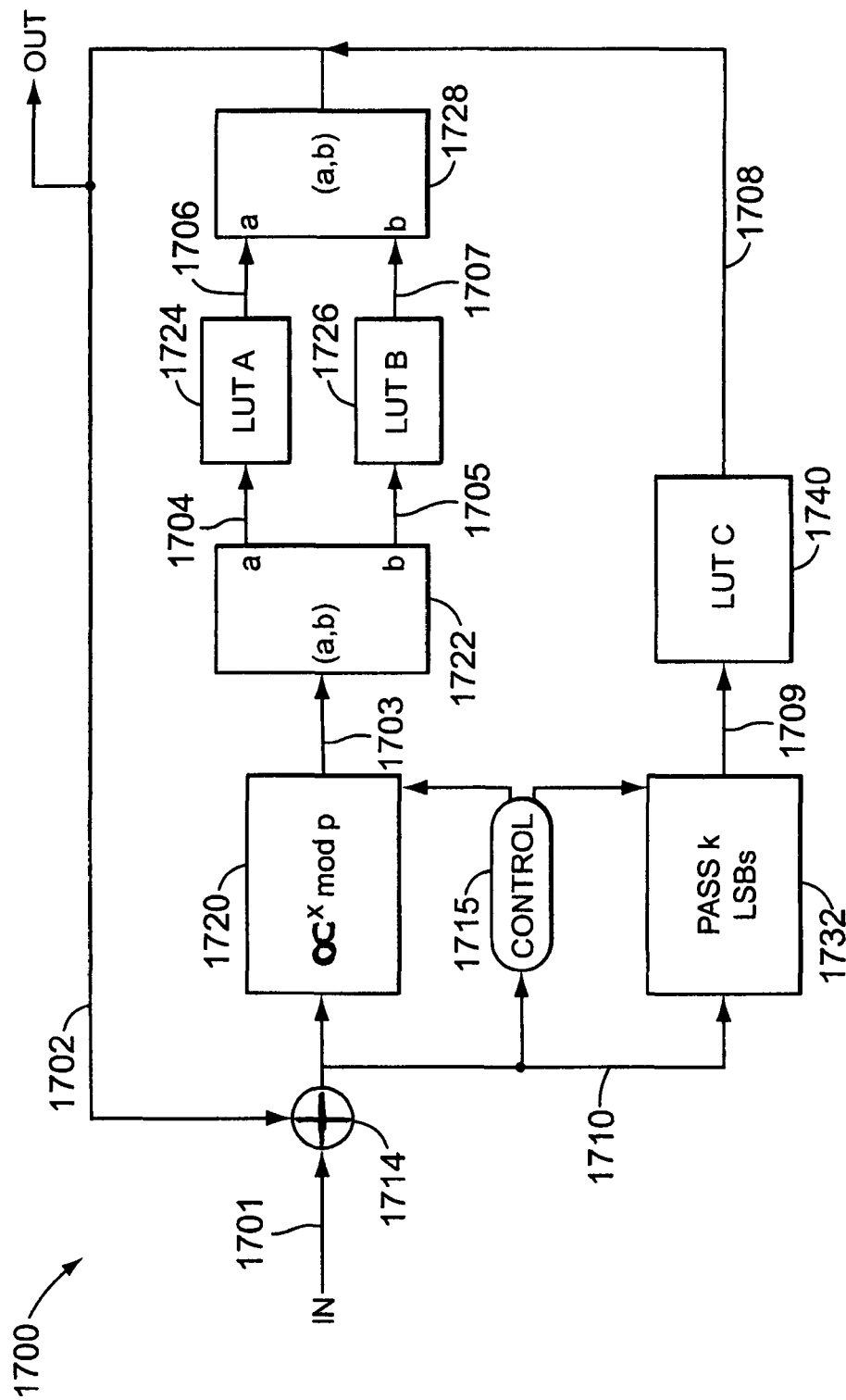
FIG. 17 illustrates one exemplary embodiment of a 32-bit secure delay employing a generator $\alpha$ of $Z_p^*$, where p is prime and between the values $2^{32}-2^k$ and $2^{32}$.

FIG. 17 illustrates one exemplary embodiment of a 32-bit secure delay 1700 employing a generator α of $Z^{p*}$, where p is prime and between the values $2^{32} - 2^k -$ and $2^{32}$. It is assumed that there is a provable prime less than $2^{32}$ and within $2^k$ of $2^{32}$, where k is small, 4-5. Block 1720 implements the operation ax mod p, producing a 32-bit output 1703 from a 32-bit input 1701 received via an XOR 1714. (The overall output of delay 1700 also feeds back to block 1720 via another 32-bit input 1702 to XOR 1714.)

Output 1703 of block 1720 is applied as an input (a,b) to block 1722, which produces separate 16-bit outputs a 1704 and b 1705. Outputs 1704, 1705 are applied to LUT A 1724 and LUT B 1726, respectively. (LUT A,B 1724, 1726 are 64K×16 and can be the same random mappings of $\{0,1\}^{16}$ or different.) Outputs 1706, 1707 of LUT A 1724 and LUT B 1726 are applied as inputs a, b, respectively, of (a,b) block 1728, which connects to output 1702.

Blocks 1732 and 1740 provide an alternative path from output 1710 of XOR 1714 to the overall output 1702 of secure delay 1700. Control block 1715 accepts 1710 as an input and selects one of block 1720 and block 1732. When block 1732 is selected, it passes k LSBs of 1710 to LUT C 1740, which provides 32 bits of output at 1702.

LUT C 1740 is $2^k \times 32$. It fills in gaps in the set $\{0,1\}^{32}$ that are not reached by LUT A 1724 and LUT B because (1) $p < 2^{32}$ and (2) a mod p is not selected for $x \geq 2^{32} - 2^k$ The pseudogroup operation will now be discussed in more detail with reference to FIGS. 18-20.

The multiplicative group xy modulo p (where p is prime) has many applications, particularly in the field of cryptography. Any unique combination of two multiplicands (i.e., inputs) from a set S:$\{1, 2, \ldots M\}$ multiplied modulo p, where the prime p=M+1, produces a unique result (i.e., output) in the set S. When p is large, the particular combination of inputs used cannot be easily determined based on a given output. The IDEA cipher exploits this property by using a multiplicative group modulo $p=2^{16}+1$ (which is prime) along with two other group operations to encrypt binary data in the set $\{1, 2, \ldots 2^{16}\}$.

Very few known moduli have the desirable property of being exactly one greater than a power of two. Appendix J-16 of the application as originally filed illustrates the undesirable lack of scalability in the IDEA cipher that results.

The pseudogroup operation, like the conventional multiplicative group of modulo p, relies on a modulo product of two numbers. This product can be implemented with a regular product followed by a modular reduction (i.e., mod p) operation, or by modular multiplication. Any suitable modular reduction or multiplication technique, can be employed. Because p=M+/−k, and k<<M, Algorithm 14.47 (see Appendix AL-1,2) from the Handbook of Applied Cryptography (incorporated herein by reference in its entirety) can be advantageously employed.

Figure 18:
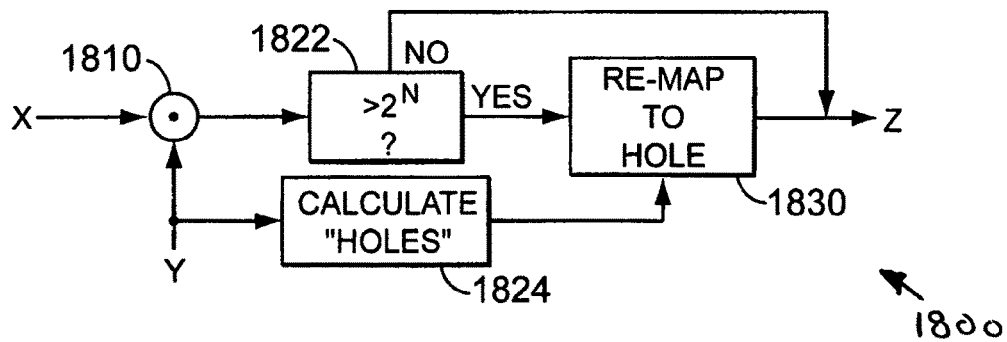
FIG. 18 illustrates a pseudogroup operation from inputs x & y to an output z with $p>2^N$.

FIG. 18 illustrates a pseudogroup operation 1800 from inputs x & y to an output z with $p > 2^N$. In one type of pseudo group operation, z=x*y mod p, where $p = 2^N + k$ and is prime, preferably the lowest prime greater than $2^N$. Inputs x and y are applied to a " " group operation 1810 and the result is applied to decision block 1822, which determines whether the result is greater than $2^N$. If it is, the output of group operation 1810 is re-mapped to a hole in the output set. A hole is a value that will not ever occur for a particular key, with any input from the set $\{1, 2, \ldots 2^N\}$.

Figure 19:
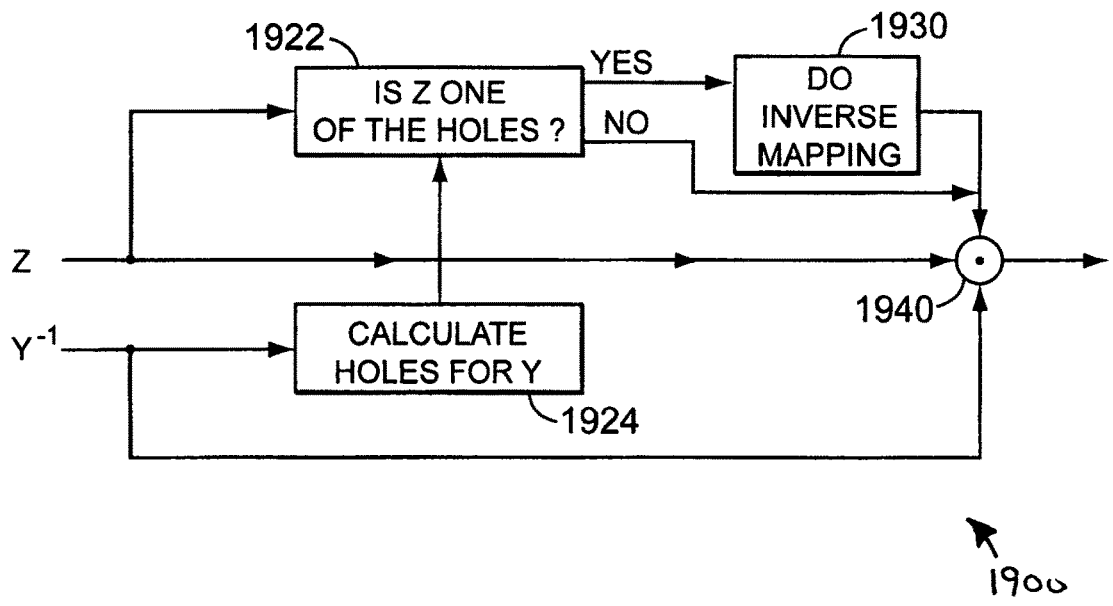
FIG. 19 illustrates an inverse pseudogroup operation from inputs z & $y^{-1}$ to an output.

Advantageously, this mapping is fully reversible—each possible input maps to a unique output, and vice versa. FIG. 19 illustrates an inverse pseudogroup operation where inputs z & $y^{-1}$ are mapped to an output. Block 1924 calculates holes for y based on input $y^{-1}$. If z is one of the holes calculated, as decided at block 1922, block 1930 does an inverse mapping and the result is applied to a " " operation at 1940, against yo1. Otherwise, the "0" operation at 1940 uses the non-mapped input z and $y^{-1}$ as its inputs.

As discussed above, a pseudogroup with p>M preferably does exception handling by mapping overflowing outputs to holes. Appendix P illustrates results of a hole plotting script written for "Octave," a GNU MATLAB alternative. Pages 1-3 of Appendix P, illustrate output values (along the row axis perpendicular to the ones and zeros parallel to the handwritten writing) that are holes. There, the holes are values that do not occur within the set S:{1, 2, . . . 64} as the result of a modulo product with modulus >64, given a particular key value (columns labeled 1-64) within set S. On page 1 of Appendix P, the modulus is 71. On page 2 of Appendix P, the modulus is 67. On page 3 of Appendix P, the modulus is 73.

The lines on the plots of each page illustrate the deterministic placement of holes given different key values within set S. In the example of page 1, a key value of 9 will have holes (i.e., non-occurring output values) of 62 (k=1), 53 (k=2), 44 (k=3), 35 (k=4), 26 (k=5), and 17 (k=6). Modulo 71 products that exceed 64 (one for each hole) can be advantageously mapped to a particular hole, depending on the amount of overflow in excess of 64. For example, an output of 65 (k=1) with a key value of 9 can be mapped to the value 62. An output of 66 (k=2) can be mapped to the value 53. Thus, a pseudogroup (p=71) output of 62, given a known key value of 9, can be deterministically converted back to an input value of 23, whose modulo product (unmapped) is 65.

A pseudogroup with modulus p<M preferably performs exception handling by permitting input values greater than p−1 to simply pass through unaltered. As illustrated on page one of Appendix I, this exception handling can be made very rare with suitable selection of M and p. Consider the example on page two of Appendix 1, where $M=2^{50}$ and $p=2^{50}-7$. (This may or may not be a suitable prime modulus, but it serves the purpose of illustration in this example). Here, the likelihood of processing an input greater than p, given uniform random distribution of input values in $(1, 2, \ldots 0.2^{50})$, appears to be only 0.004 after nearly $10^{12}$ iterations. With this low level of error, the straightforward alternative of simply allowing the erroneous output to occur and permitting conventional error-correction coding to compensate for it becomes attractive.

Figure 20:
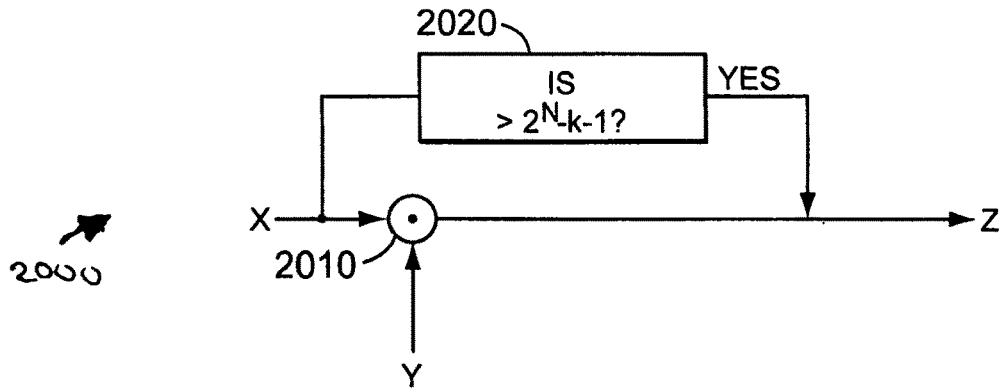
FIG. 20 illustrates a pseudogroup operation from inputs x & y to an output z with $p<2^N$.

FIG. 20 illustrates a pseudogroup operation from inputs x & y to an output z with $p<2^N$. Block 2020 decides if input x is $>2^N-k-1$ and, if so, bypasses " " operation 2010, in which case output z is equal to input x. Otherwise, output z is the result of operation 2010 based on inputs x and y.

TABLE IV below shows a mathematical derivation of exemplary equations for pseudogroup encryption and decryption.

TABLE IV

Encryption (forward)
Sub-block size $M = 2^N$, p = prime just above M
a = plaintext, x = key
1.    z = ax mod p
2.    If z > M,
2.1        k = z − M
2.2        z = kx − (p − M − 1) mod p
        end Decryption (inverse)
z = ciphertext, $x^{-1}$ = inverse key
1.    k = $x^{-1}$ (z +(p − M − 1)) mod p
2.    If 1 ≤ k ≤ (p − M − 1),
2.1        z = M + k
        end
2.3    a = $zx^{-1}$ mod p When performing a pseudogroup operation with p<M, key values should be less than p. TABLE V below shows an example of such an operation, with an unrealistically small but illustrative value of p.

TABLE V

| | | KEY VALUES → | | | | | | | |
|---|---|---|---|---|---|---|---|---|---|
| | | 1 | 2 | 3 | 4 | 5 | 6 | 7 | 8 |
| INPUT | 1 | 1 | 2 | 3 | 4 | 5 | 6 | 7 | 8 |
| VALUES | 2 | 2 | 4 | 6 | 1 | 3 | 5 | 7 | 8 |
| ↓ | 3 | 3 | 6 | 2 | 5 | 1 | 4 | 7 | 8 |
| | 4 | 4 | 1 | 5 | 2 | 6 | 3 | 7 | 8 |
| | 5 | 5 | 3 | 1 | 6 | 4 | 2 | 7 | 8 |
| | 6 | 6 | 5 | 4 | 3 | 2 | 1 | 7 | 8 |
| | 7 | | | ILLEGAL KEY VALUES | | | | | |
| | 8 | | | | | | | | |

TABLE VI below shows results of a "pseudogroup" operation with the prime number 11 and a three-bit set of integers 1-8.

TABLE VI

| | | KEY VALUES → | | | | | | | |
|---|---|---|---|---|---|---|---|---|---|
| | | 1 | 2 | 3 | 4 | 5 | 6 | 7 | 8 |
| INPUT | 1 | 1 | 2 | 3 | 4 | 5 | 6 | 7 | 8 |
| VALUES | 2 | 2 | 4 | 6 | 8 | 10 | 1 | 3 | 5 |
| ↓ | 3 | 3 | 6 | 9 | 1 | 4 | 7 | 10 | 2 |
| | 4 | 4 | 8 | 1 | 5 | 9 | 2 | 6 | 10 |
| | 5 | 5 | 10 | 4 | 9 | 3 | 8 | 2 | 7 |
| | 6 | 6 | 1 | 7 | 2 | 8 | 3 | 9 | 4 |
| | 7 | 7 | 3 | 10 | 6 | 2 | 9 | 5 | 1 |
| | 8 | 8 | 5 | 2 | 10 | 7 | 4 | 1 | 9 |

TABLE VII below shows key values and holes associated with them for different output values. Each row contains input values producing a given output, except for holes, which are marked with the letter "X." Each column contains key values producing outputs for a given input, except for holes.

A hole is an output value that will not occur for any in the set $\{1, 2, \ldots 2^m\}$ of possible key values, given a particular input valued in that set. Note from TABLES V and VI that the output value of 7 does not occur with the key value of 2.

TABLE VII

| | | KEY VALUES 4 | | | | | | | |
|---|---|---|---|---|---|---|---|---|---|
| | | 1 | 2 | 3 | 4 | 5 | 6 | 7 | 8 |
| OUTPUT | 1 | 1 | 6 | 4 | 3 | X | 2 | 8 | 7 |
| VALUES | 2 | 2 | 1 | 8 | 6 | 7 | 4 | 5 | 3 |
| ↓ | 3 | 3 | 7 | 1 | X | 5 | 6 | 2 | X |
| | 4 | 4 | 2 | 5 | 1 | 3 | 8 | X | 6 |
| | 5 | 5 | 8 | X | 4 | 1 | X | 7 | 2 |
| | 6 | 6 | 3 | 2 | 7 | X | 1 | 4 | X |
| | 7 | 7 | X | 6 | X | 8 | 3 | 1 | 5 |
| | 8 | 8 | 4 | X | 2 | 6 | 5 | X | 1 |

A cryptographic document destruction system according to various aspects of the invention includes an encryption subsystem and a decryption subsystem. The decryption subsystem uses a temporary key that can be disposed of to make encrypted communications unreadable.

An encryption key allows an authorized person to decrypt encrypted communications. For example, an encryption key can be a passphrase, or use a passphrase, known only to a person authorized to decrypt communications. According to various aspects of the present inventions, the decryption key can be destroyed. A passphrase for such a decryption key is preferably forgettable, for example a random alphanumeric string of sufficient length to be secure. Advantageously, the alphanumeric string can be used as a passphrase to open communications or records when is desired to do so and then destroyed and forgotten about when it is no longer desired for such communications or records to ever be decrypted again.

Operation of one embodiment includes (1) writing an electronic mail message to a person; (2) encrypting the communications using an agreed-upon passphrase, preferably an alphanumeric random digit string, for example twelve digits in length; (3) sending the encrypted message to the recipient; (4) having the recipient type in the passphrase to open the encrypted communications; and then after a predetermined or agreed-upon period of time, (5) having both parties destroy the passphrase (throwing away a POST-IT note upon which the passphrase is written) so that neither the sender nor the recipient can ever decrypt the communication again. Preferably, the passphrase is used only for a short length of time or limited number of times so that it is impossible for either party to remember it. The more random and arbitrary cryptic the passphrase is, the more difficult it will be to ever remember.

Systems according to various aspects of the invention can be useful in the legal profession where sometimes legal professionals are called upon to testify about matters that were assumed to be privileged but the court determines that they are not for whatever reason, as happens in patent practice sometimes. If an attorney or agent has communicated with his client using this system, and the client agrees to destroy the passphrase after the matter is complete, and the advice communicated by the attorney or agent is no longer relevant or needed and has been acted upon completely, then it is impossible for any court or any party to discover what the parties discussed.

Even if a backup copy of an electronic mail message is found, a court can authorize a cryptananalysis of the message, but if it is encrypted using PGP strong encryption, it would be very difficult, effectively impossible, for the opposing party to figure out what the message said.

Embodiments can be employed in other types of communications that are encoded in digital form so that they can be encrypted. Even handwritten notes can be scanned into digital form and encrypted.

Voice messages can be digitized and compressed, entire paper files can be archived by scanning and digitizing, and then encrypting into a single encrypted archive file with a temporary key that can be disposed of after a predetermined time, which can be set by policy, for example one year.

According to another aspect of the invention, the keys need not be remembered or typed in by a human operator at all. According to this aspect, the key is an actual hardware device that transmits decrypting authorization indicia for a predetermined or agreed-upon period of time and then is incapable of doing so after that. An example of such a key is placed between a conventional PC keyboard and a Pc. The device includes circuitry for reading a decryption key code or indicia from another device such as a card having barcodes printed on it or a disposable integrated circuit, which can be made in the form of a key.

The device can be sold with a number of keys that can be used and disposed of by the user. For example, if the device is sold with twelve keys with refills of twelve additional keys available by ordering, the user can encrypt archive records every month with a different key and cost a new (different) key away every month. The user may wish to keep the records on file for a period of several months in which case the user will begin using a key one month and then put the key into storage for a couple of months and then toss the key away, destroying it irretrievably after that period of time.

An embodiment using printed cards is less expensive and the keys can be disposed of more cheaply but it is more prone to unauthorized or inadvertent duplication, in which case the whole purpose of the system might be defeated. The user of such a system needs to take precautions that the keys are never duplicated.

A database of which files correspond to which temporary keys can be created according to aspects of the invention so that an administrator can look over the list of keys about to expire and ask the persons involved with the effective files whether or not they need information from the files before they are destroyed. Paper documents can be shredded at the same time the keys are destroyed. If the key for a paper file that has a corresponding electronic file is a card, the card can be kept with the paper file and both can be destroyed simultaneously.

The key can be distributed from a sender of information to a recipient who is only authorized to access the information for a temporary period of time, for example one or two days. The sender of the information, or provider, can demand the key back after that period of time. In such a system, the key needs to be difficult to duplicate, for example an integrated circuit in the shape of a key. A forgettable password would not work for such a system because the user could write it down without telling the sender, but the forgettable password system works well when both parties, or all parties involved, are in cooperation and consent to destroy the information and the forgettable password.

Figure 21:
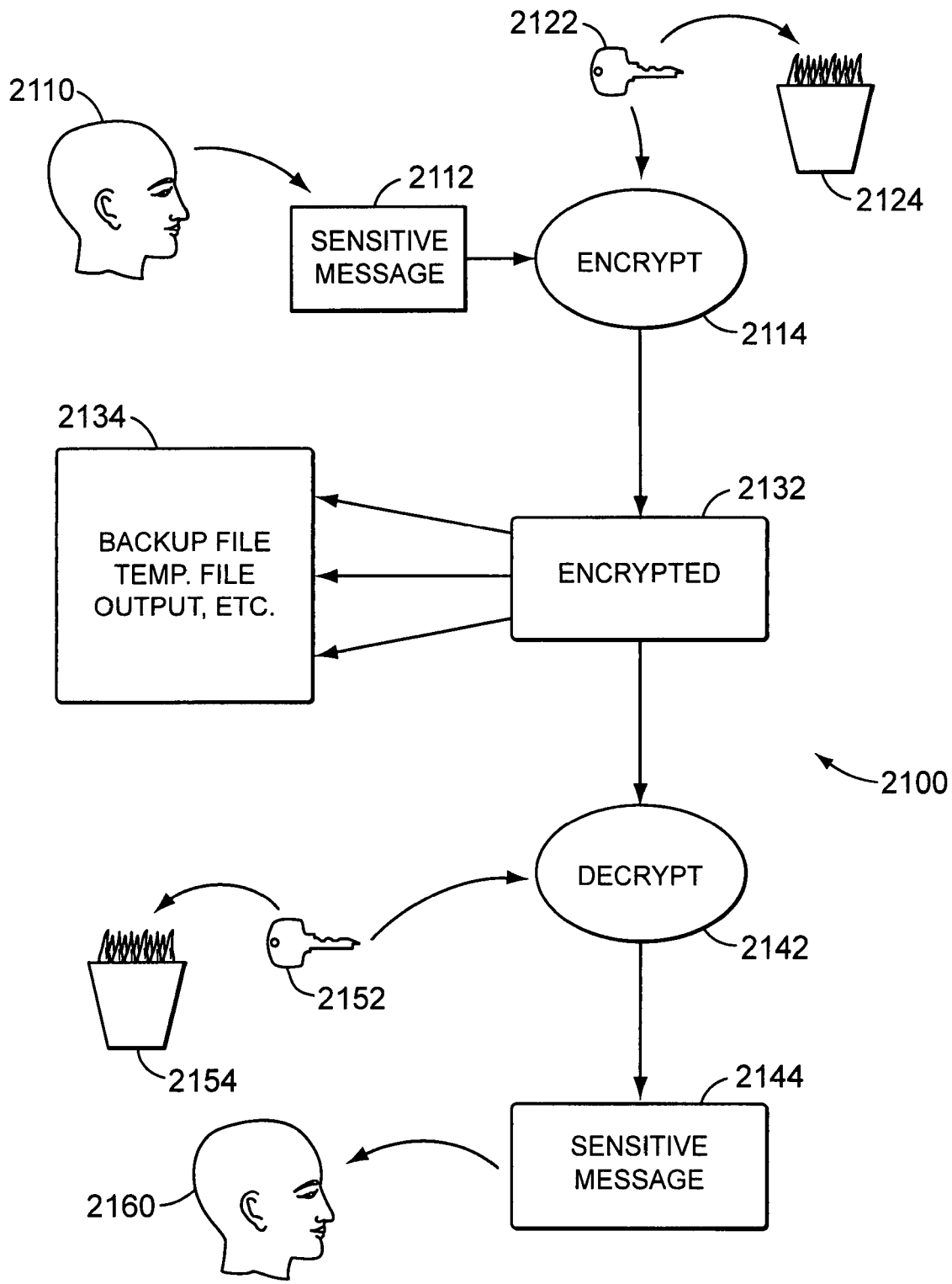
FIG. 21 illustrates purging of a sensitive message by a mutual destruction of shared keys.

In the process flow illustrated in FIG. 21, a sensitive message 2112, which is never saved, preferably, comes from a sender/originator 2110. Encrypt 2114 uses a temporary key 2122, which is destroyed after a period "X."

Encrypted 2132 goes to backup file, temp.file, output, etc. 2134 and to decrypt 2142, which uses another temporary key 2152, that goes to 2154 after period "X." Sensitive message 2144 from decrypt 2142, which also is preferably never saved, goes to recipient 2160.

Per another aspect, a hardware electronic record "lock" with a disposable key token is employed, such as a simple paper card with a bar code printed on it. The key token can be thrown away when the "locked" (i.e., encrypted) electronic record is to be purged, making decryption of it practically impossible.

Signed Media Streams

Signed media streams is another aspect of the general concept of calculating a digital signature based on all of the contents of an electronic record except an excluded signature portion. (The general concept advantageously gets around the circular problem of a document essentially signing itself.) With modern technology, it is difficult to place trust in the authenticity of a video or audio recording. Portions of the recording can be digitally modified in a way that even a careful observer cannot detect. One advantageous aspect of this invention permits a video or audio recording to be validated without requiring special a recording format. Another advantageous aspect of this invention performs frame-by frame authentication of a recording to ensure that the observer is alerted to unauthenticated portions of the recording.

Appendix E includes two figures, one depicting the spectrum of an audio recording with an out-of-band transmission of digital signature information, and the other depicting the frame-by frame computation and transmission of digital signatures. During frame T2, a digital signature 51 is computed based on digital samples of the recording within frame T1, and the signature 51 is transmitted (along with other digital samples of the recording) in frame T3. During frame T3, a digital signature 52 is computed based on digital samples of the recording within frame T2, and the signature 52 is transmitted (along with other digital samples of the recording) in frame T4 (not shown). Optionally, digital signature 52 can include (or consist of) an aggregate signature formed from a bitwise modulo sum of the signature and the previous signature.

Advantageously, the video or audio recording can be transmitted and stored independent of any specific digital format, as long as the modulated digital signature information is faithfully conveyed along with the recording information. To allow for degradation of the recording, the signature is preferably computed based on truncated samples. An example of a truncated sample is an audio sample (e.g., noisy 16 bits) that is set to the nearest value within a truncated binary set (e.g., 8 bits). The likelihood of a noisy value being pushed over a boundary between values within the truncated set is small, about $2^n(x-y)$ where x is the full set size in bits and y is the truncated set size in bits.

With x-y=8, the likelihood is 1 in 255, which represents a fairly significant probability of signature error in a given frame. Consequently, the number of samples in a frame should be kept fairly small.

More preferably, speech statistics (i.e., "feature vectors") used in speech recognition (13 spectral magnitude values within 10 ms frames) can be derived from the recording. If the derivation of the statistics can be made robust in the presence of noise, less signature errors will result.

The media player can authenticate the media stream by including a visually intuitive authentication display. The display can take into account a running statistic of frame authentications, for example by slightly decreasing a "gas gauge" bar for each signature error in a moving average of 32 frames. If frames are short enough, the speech content will not be suspect unless a large gap occurs.

What is claimed is:

1. A method comprising:
   receiving at a recipient device, an electronic message, wherein the electronic message is encrypted using an encryption key configured as a temporary key that is only viable for a predetermined period, after which the temporary key is no longer viable, and wherein the recipient's ability to access the electronic message is dependent on the encryption key still being viable;
   displaying at the recipient device, the electronic message prior to the predetermined period for the temporary key ending; and
   after the predetermined period has ended:
      causing transmission of the encryption key to a sender of the electronic message.

2. The method of claim 1 wherein the electronic message is received via a remote secure messaging system coupled to a hardware device storing the temporary key.

3. The method of claim 2, further comprising disabling the hardware device based at least in part on a comparison between a current time and a period of time associated with an operable time for the stored temporary key.

4. The method of claim 1, further comprising receiving, at the recipient device, the temporary key.

5. The method of claim 2, wherein the encrypted message is generated by a method comprising receiving, at the remote secure messaging system from a device associated with a sender of the electronic message, user authenticating information.

6. The method of claim 5, wherein the user authenticating information comprises a passphrase input.

7. The method of claim 2, wherein an association between the temporary key and the encrypted message is stored in a database associated with the remote secure messaging system.

8. The method of claim 7, further comprising:
   determining a period of time associated with an operable time for the temporary key is expired;
   deleting, from the database, the association between the temporary key and the encrypted message; and
   deleting the encrypted message from the remote secure messaging system.

9. The method of claim 1, wherein the electronic message comprises at least one of image data, text data, video data, or audio data.

10. The method of claim 2 wherein the encrypted message is generated dynamically in response to determining that the predetermined period has not expired.

11. A secure messaging system comprising:
    a receiver configured to receive an electronic message for a recipient;
    a memory storing machine readable instructions; and
    one or more processors configured to execute the machine readable instructions to cause the secure messaging system to:
       provide access to the electronic message, wherein the electronic message is encrypted using an encryption key configured as a temporary key that is only viable for a predetermined period, after which the temporary key is no longer viable, and wherein the provided access to the electronic message is dependent on the encryption key still being viable; and
       after the predetermined period has expired:
          in response to a request for the encryption key from a sender of the electronic message, causing transmission of the encryption key to the sender.

12. The secure messaging system of claim 11, wherein the one or more processors are further configured to execute the machine readable instructions to cause the secure messaging system to receive the temporary key from a hardware device storing the temporary key.

13. The secure messaging system of claim 12, wherein the secure messaging system comprises the hardware device.

14. The secure messaging system of claim 12, wherein the one or more processors are further configured to execute the machine readable instructions to cause the secure messaging system to disable the hardware device based least in part on a comparison between a current time and a period of time associated with an operable time for the stored temporary key.

15. The secure messaging system of claim 11, the receiver is further configured to receive, from a device associated with a sender of the electronic message, the temporary key.

16. The secure messaging system of claim 11, wherein the receiver is further configured to receive, from a device associated with a sender of the electronic message, user authenticating information, wherein generating the encrypted message is further based at least in part on the user authenticating information.

17. The secure messaging system of claim 16, wherein the user authenticating information comprises a passphrase input.

18. The secure messaging system of claim 11, wherein the one or more processors are further configured to execute the machine readable instructions to cause the secure messaging system to:
  store, in the memory, an association between the temporary key and the encrypted message;
  determine a period of time associated with an operable time for the temporary key is expired;
  delete, from the memory, the association between the temporary key and the encrypted message; and
  delete, from the memory, the encrypted message.

19. A non-transitory computer-readable storage medium including instructions executable by one or more processors of a secure messaging system, the instructions causing the secure messaging system to:
  receive at a recipient device, an electronic message, wherein the electronic message is encrypted using an encryption key configured as a temporary key that is only viable for a predetermined period, after which the temporary key is no longer viable, and wherein the recipient's ability to access the electronic message is dependent on the encryption key still being viable;
  display at the recipient device, the electronic message prior the predetermined period for the temporary key ending; and
  after the predetermined period has ended:
    causing transmission of the encryption key to a sender of the electronic message.

20. The method of claim 1, wherein the encryption key is configured such that it is difficult to duplicate.

* * * * *